US012057611B2

(12) United States Patent
Srirattana et al.

(10) Patent No.: US 12,057,611 B2
(45) Date of Patent: Aug. 6, 2024

(54) DIRECTIONAL COUPLER WITH MULTIPLE ARRANGEMENTS OF TERMINATION

(71) Applicant: SKYWORKS SOLUTIONS, INC., Irvine, CA (US)

(72) Inventors: Nuttapong Srirattana, Lexington, MA (US); Sriram Srinivasan, Bedford, MA (US); Zijiang Yang, Lexington, MA (US); Ujjwal Kumar, Woburn, MA (US)

(73) Assignee: SKYWORKS SOLUTIONS, INC., Irvine, CA (US)

( * ) Notice: Subject to any disclaimer, the term of this patent is extended or adjusted under 35 U.S.C. 154(b) by 0 days.

(21) Appl. No.: 17/804,766

(22) Filed: May 31, 2022

(65) Prior Publication Data

US 2022/0393326 A1 Dec. 8, 2022

Related U.S. Application Data

(60) Provisional application No. 63/195,823, filed on Jun. 2, 2021.

(51) Int. Cl.
*H01P 5/18* (2006.01)
*H01P 1/24* (2006.01)

(52) U.S. Cl.
CPC .................. *H01P 1/24* (2013.01); *H01P 5/18* (2013.01); *H01P 5/184* (2013.01)

(58) Field of Classification Search
CPC .. H01P 5/184; H01P 5/185; H01P 5/18; H01P 5/12; H01P 5/16; H01P 5/183; H01P 5/186; H01P 5/187; H01P 1/24
See application file for complete search history.

(56) References Cited

U.S. PATENT DOCUMENTS

| | | |
|---|---|---|
| 3,611,199 A | 10/1971 | Safran |
| 3,868,594 A | 2/1975 | Cornwell et al. |
| 4,460,875 A | 7/1984 | Harman |
| 4,677,399 A | 6/1987 | Le Dain et al. |

(Continued)

FOREIGN PATENT DOCUMENTS

| | | |
|---|---|---|
| CN | 108470968 A | 8/2018 |
| EP | 2503701 A2 | 9/2012 |

(Continued)

OTHER PUBLICATIONS

Chen et al., "A High-Directivity Microstrip Directional Coupler With Feedback Compensation", 2002 IEEE MTT-S International Microwave Symposium Digest, issued in 2002, pp. 101-104.

(Continued)

*Primary Examiner* — Stephen E. Jones
(74) *Attorney, Agent, or Firm* — Lando & Anastasi, LLP

(57) ABSTRACT

According to some aspects of this disclosure a radio frequency signal coupler is provided. The radio frequency coupler includes an input port, an output port, a main transmission line extending between the input port and the output port, a coupled transmission line electromagnetically coupled to the main transmission line, at least one coupled port coupled to the coupled transmission line, and a plurality of termination ports connected to the coupled transmission line, each termination port of the plurality of termination ports being connected to the coupled transmission line at a different location to provide a plurality of coupling factors corresponding to a plurality of signal frequencies.

21 Claims, 12 Drawing Sheets

(56) References Cited

U.S. PATENT DOCUMENTS 4,764,740 A 8/1988 Meyer
5,038,112 A 8/1991 O'Neill
5,222,246 A 6/1993 Wolkstein
5,276,411 A 1/1994 Woodin, Jr. et al.
5,363,071 A 11/1994 Schwent et al.
5,487,184 A 1/1996 Nagode
5,625,328 A 4/1997 Coleman, Jr.
5,745,016 A 4/1998 Salminen
5,767,753 A 6/1998 Ruelke
5,903,820 A 5/1999 Hagstrom
6,020,795 A 2/2000 Kim
6,078,299 A 6/2000 Scharfe, Jr.
6,108,527 A 8/2000 Urban et al.
6,329,880 B2 12/2001 Akiya
6,496,708 B1 12/2002 Chan et al.
6,559,740 B1 5/2003 Schulz et al.
6,771,141 B2 8/2004 Iida et al.
6,803,818 B2 10/2004 van Amerom
6,972,640 B2 12/2005 Nagamori et al.
7,042,309 B2 5/2006 Podell
7,224,244 B2 5/2007 Drapac et al.
7,230,316 B2 6/2007 Yamazaki et al.
7,236,069 B2 6/2007 Puoskari
7,305,223 B2 12/2007 Liu et al.
7,319,370 B2 1/2008 Napijalo
7,336,142 B2 2/2008 Vogel
7,493,093 B2 2/2009 Boerman et al.
7,538,635 B2 5/2009 Fukuda et al.
7,546,089 B2 6/2009 Bellantoni
7,966,140 B1 6/2011 Gholson, III et al.
7,973,358 B2 7/2011 Hanke et al.
8,115,234 B2 2/2012 Nakajima et al.
8,175,554 B2 5/2012 Camuffo et al.
8,248,302 B2 8/2012 Tsai et al.
8,289,102 B2 10/2012 Yamamoto et al.
8,315,576 B2 11/2012 Jones
8,334,580 B2 12/2012 Sakurai et al.
8,417,196 B2 4/2013 Kitching et al.
8,526,890 B1 9/2013 Chien et al.
8,606,198 B1 12/2013 Wright
8,633,761 B2 1/2014 Lee
8,761,026 B1 6/2014 Berry et al.
8,810,331 B2 8/2014 Gu et al.
9,014,647 B2 4/2015 Kitching et al.
9,214,967 B2 12/2015 Reisner et al.
9,225,382 B2 12/2015 Khlat
9,356,330 B1 5/2016 Donoghue et al.
9,425,835 B2 8/2016 Seckin et al.
9,496,902 B2 11/2016 Srirattana et al.
9,553,617 B2 1/2017 Srirattana et al.
9,614,269 B2 4/2017 Srirattana et al.
9,634,371 B2 4/2017 Swarup et al.
9,647,314 B1 5/2017 Nguyen et al.
9,692,103 B2 6/2017 Srirattana et al.
9,748,627 B2 8/2017 Sun et al.
9,755,670 B2 9/2017 Chen et al.
9,793,592 B2 10/2017 Srirattana et al.
9,812,757 B2 11/2017 Srirattana et al.
9,866,244 B2 1/2018 Srirattana et al.
9,941,856 B2 4/2018 Srirattana et al.
9,948,271 B2 4/2018 Srirattana et al.
9,953,938 B2 4/2018 Srirattana et al.
9,954,564 B2 4/2018 Little et al.
9,960,747 B2 5/2018 Whitefield et al.
9,960,750 B2 5/2018 Srirattana et al.
10,084,224 B2 9/2018 Srirattana et al.
10,128,558 B2 11/2018 Sun et al.
10,164,681 B2 12/2018 Roy et al.
10,249,930 B2 4/2019 Srirattana et al.
10,284,167 B2 5/2019 Srirattana et al.
10,403,955 B2 9/2019 Srirattana et al.
10,553,925 B2 2/2020 Srirattana et al.
10,707,826 B2 7/2020 Srirattana et al.
10,742,189 B2 8/2020 Srirattana et al.
10,763,568 B2 9/2020 Srirattana et al.
2002/0097100 A1 7/2002 Woods et al.
2002/0113601 A1 8/2002 Swank
2002/0113666 A1 8/2002 Yamazaki et al.
2002/0139975 A1 10/2002 Lewis et al.
2003/0214365 A1 11/2003 Adar et al.
2004/0127178 A1 7/2004 Kuffner
2004/0201526 A1 10/2004 Knowles et al.
2005/0017821 A1 1/2005 Sawicki
2005/0040912 A1 2/2005 Pelz
2005/0146394 A1 7/2005 Podell
2005/0170794 A1 8/2005 Koukkari et al.
2005/0239421 A1 10/2005 Kim et al.
2006/0232359 A1 10/2006 Fukuda et al.
2007/0082642 A1 4/2007 Hattori
2007/0109072 A1 5/2007 Rai et al.
2007/0159268 A1 7/2007 Podell
2008/0036554 A1 2/2008 Krausse et al.
2008/0055187 A1 3/2008 Tamura et al.
2008/0056638 A1 3/2008 Glebov et al.
2008/0070519 A1 3/2008 Okabe
2008/0112466 A1 5/2008 Sasaki
2009/0134953 A1 5/2009 Hunt et al.
2009/0195335 A1 8/2009 Wahl et al.
2009/0278624 A1 11/2009 Tsai et al.
2009/0280755 A1 11/2009 Camuffo et al.
2009/0322313 A1 12/2009 Zhang et al.
2011/0057746 A1 3/2011 Yamamoto et al.
2011/0063044 A1 3/2011 Jones
2011/0148548 A1 6/2011 Uhm et al.
2011/0199166 A1 8/2011 Carrillo-Ramirez
2011/0254637 A1 10/2011 Manssen et al.
2011/0255575 A1 10/2011 Zhu et al.
2011/0279192 A1 11/2011 Nash et al.
2011/0298559 A1 12/2011 Kitching et al.
2012/0019332 A1 1/2012 Hino et al.
2012/0019335 A1 1/2012 Hoang et al.
2012/0062333 A1 3/2012 Ezzeddine et al.
2012/0071123 A1 3/2012 Jones et al.
2012/0195351 A1 8/2012 Banwell et al.
2012/0243579 A1 9/2012 Premakanthan et al.
2013/0005284 A1 1/2013 Dalipi
2013/0113575 A1 5/2013 Easter
2013/0194054 A1 8/2013 Presti
2013/0207741 A1 8/2013 Presti
2013/0241668 A1 9/2013 Tokuda et al.
2013/0293316 A1 11/2013 Kitching et al.
2013/0307635 A1 11/2013 Kase et al.
2014/0152253 A1 6/2014 Ozaki et al.
2014/0213201 A1 7/2014 Reisner et al.
2014/0227982 A1 8/2014 Granger-Jones et al.
2014/0266499 A1 9/2014 Noe
2014/0368293 A1 12/2014 Mukaiyama
2015/0002239 A1 1/2015 Tanaka
2015/0042412 A1 2/2015 Imbornone et al.
2015/0043669 A1 2/2015 Ella et al.
2015/0048910 A1 2/2015 Lafountain et al.
2015/0072632 A1 3/2015 Pourkhaatoun et al.
2015/0091668 A1 4/2015 Solomko et al.
2015/0200437 A1 7/2015 Solomko et al.
2015/0249485 A1 9/2015 Ouyang et al.
2015/0270821 A1 9/2015 Natarajan et al.
2015/0326202 A1 11/2015 Nicholls et al.
2015/0349742 A1 12/2015 Chen et al.
2015/0372366 A1 12/2015 Frye
2016/0025928 A1 1/2016 Onawa
2016/0028147 A1 1/2016 Srirattana et al.
2016/0028420 A1 1/2016 Srirattana et al.
2016/0043458 A1 2/2016 Sun et al.
2016/0065167 A1 3/2016 Granger-Jones et al.
2016/0079649 A1 3/2016 Ilkov et al.
2016/0079650 A1 3/2016 Solomko et al.
2016/0172737 A1 6/2016 Srirattana et al.
2016/0172738 A1 6/2016 Srirattana et al.
2016/0172739 A1 6/2016 Srirattana et al.
2016/0172740 A1 6/2016 Srirattana et al.
2016/0268994 A1 9/2016 Granger-Jones et al.
2016/0344430 A1 11/2016 Srirattana et al.
2016/0344431 A1 11/2016 Srirattana et al.
2016/0373146 A1 12/2016 Manssen et al.

(56) References Cited

U.S. PATENT DOCUMENTS

| | | | |
|---|---|---|---|
| 2017/0026020 A1 | 1/2017 | Solomko et al. |
| 2017/0033428 A1 | 2/2017 | Ootsuka et al. |
| 2017/0063425 A1 | 3/2017 | Khlat et al. |
| 2017/0077966 A1 | 3/2017 | Chen et al. |
| 2017/0085245 A1 | 3/2017 | Srirattana et al. |
| 2017/0141802 A1 | 5/2017 | Solomko et al. |
| 2019/0379099 A1 | 12/2019 | Srirattana et al. |
| 2022/0271409 A1 | 8/2022 | Yang et al. |
| 2022/0359970 A1 | 11/2022 | Srinivasan et al. |
| 2022/0359971 A1 | 11/2022 | Srinivasan et al. |

FOREIGN PATENT DOCUMENTS

| | | | |
|---|---|---|---|
| GB | 2343790 | A | 5/2000 |
| JP | S62-159502 | A | 7/1987 |
| JP | H01274502 | A | 11/1989 |
| JP | H08505750 | A | 6/1996 |
| JP | 2000-077915 | A | 3/2000 |
| JP | 2001127664 | A | 5/2001 |
| JP | 2011040978 | A | 2/2011 |
| JP | 2013126067 | A | 6/2013 |
| KR | 20040037465 | A | 5/2004 |
| KR | 20110118289 | A | 10/2011 |
| KR | 20120007790 | A | 1/2012 |
| WO | 2005018451 | A1 | 3/2005 |
| WO | 2015020927 | A2 | 2/2015 |
| WO | 2015134979 | A1 | 9/2015 |
| WO | 2017044729 | A1 | 3/2017 |

OTHER PUBLICATIONS

Combined Search and Examination Report from corresponding United Kingdom Application No. 2208010.5 dated Nov. 25, 2022.

DIRECTIONAL COUPLER WITH MULTIPLE ARRANGEMENTS OF TERMINATION

RELATED APPLICATIONS

This application claims priority to and the benefit of U.S. Provisional Application No. 63/195,823, filed Jun. 2, 2021 and titled DIRECTIONAL COUPLER WITH MULTIPLE ARRANGEMENTS OF TERMINATION, which is incorporated in its entirety herein by reference.

BACKGROUND

Field of Invention

The present disclosure relates generally to directional couplers. More particularly, aspects of the present disclosure relate to systems and methods for improving coupler performance using multiple termination arrangements.

SUMMARY

According to some aspects of the disclosure, a radio frequency signal coupler is provided. The radio frequency signal coupler comprises an input port, an output port, a main transmission line extending between the input port and the output port, a coupled transmission line electromagnetically coupled to the main transmission line, at least one coupled port coupled to the coupled transmission line, and a plurality of termination ports connected to the coupled transmission line, Each termination port of the plurality of termination ports is connected to the coupled transmission line at a different location to provide a plurality of coupling factors corresponding to a plurality of signal frequencies.

In some embodiments a plurality of termination impedances are coupled to the plurality of termination ports. In various embodiments, a plurality of switches configured to selectively connect the plurality of termination impedances to the plurality of termination ports are provided. In some embodiments, termination impedance of the plurality of termination impedances includes a fixed impedance and/or an adjustable impedance. In some embodiments, the switches of the plurality of switches are symmetrically coupled to the coupled transmission line and configured to selectively couple the impedances of the plurality of termination impedances based on a radio frequency signal being received at the input port or the output port.

In various embodiments a first termination impedance of the plurality of termination impedances is coupled to a first termination port of the plurality of termination ports and a second termination impedance of the plurality of termination impedances is coupled to a second termination port of the plurality of termination ports. In some embodiments the first termination impedance is tuned to a first signal frequency of the plurality of signal frequencies and the second termination impedance is tuned to a second signal frequency of the plurality of signal frequencies. In numerous embodiments the first termination port is connected to the coupled transmission line at a first location to provide a first coupling factor corresponding to the first signal frequency and the second termination port is connected to the coupled transmission line at a second location to provide a second coupling factor corresponding to the second signal frequency.

In some embodiments the first coupling factor corresponds to a first length of the coupled transmission line between the first termination port and the at least one coupled port and the second coupling factor corresponds to a second length of the coupled transmission line between the second termination port and the at least one coupled port. In numerous embodiments the first coupling factor is selected to provide a desired level of insertion loss at the first signal frequency and the second coupling factor is selected to provide a desired level of insertion loss at the second signal frequency. In various embodiments the first coupling factor at the first signal frequency is substantially similar to the second coupling factor at the second signal frequency.

In some embodiments the radio frequency signal coupler is configured to minimize insertion loss between the input port and the output port at the first and second signal frequencies. In numerous embodiments the at least one coupled port includes a first coupled port configured to provide a first coupled signal when an input radio frequency signal is received at the input port. In various embodiments the radio frequency signal coupler is configured to maintain a substantially constant power level of the first coupled signal at the first and second signal frequencies. In some embodiments the at least one coupled port includes a second coupled port configured to provide a second coupled signal when an input radio frequency signal is received at the output port. In numerous embodiments the radio frequency signal coupler is configured to maintain a substantially constant power level of the second coupled signal at the first and second signal frequencies.

According to some aspects of the disclosure, a method of reducing insertion loss in a radio frequency coupler is provided. The method includes receiving a radio frequency (RF) signal on a first transmission line that is electromagnetically coupled to a second transmission line, the RF signal having a frequency that is one of a first frequency and a second frequency different than the first frequency, inducing an induced RF signal on the second transmission line based on the RF signal, the induced RF signal having one of the first frequency and the second frequency corresponding to the frequency of the RF signal, terminating the induced RF signal having the first frequency at a first position along a length of the second transmission line to provide a first coupled signal with a first coupling factor, and terminating the induced RF signal having the second frequency at a second position along the second transmission line to provide a second coupled signal with a second coupling factor that is substantially the same as the first coupling factor.

In some embodiments, the method includes adjusting at least one impedance of a plurality of impedances coupled to the second transmission line to change the coupling factor of the first and second transmission lines. In various embodiments wherein the second transmission line has one or more switches coupled to the plurality of impedances, the method includes selectively switching the switches on or off based on at least one of a direction or frequency of the RF signal.

In numerous embodiments, the method includes selecting the first and second positions to maximize directivity at the first and second frequencies, maximize isolation at the first and second frequencies, minimize the first coupling factor at the first frequency, and minimize the second coupling factor at the second frequency.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Aspects and examples are directed to bidirectional couplers and components thereof, and to devices, modules, and systems incorporating same.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of “including,” “comprising,” “having,” “containing,” “involving,” and variations thereof is meant to encompass the items listed thereafter and equivalents thereof as well as additional items. References to “or” may be construed as inclusive so that any terms described using “or” may indicate any of a single, more than one, and all of the described terms.

Figure 1:
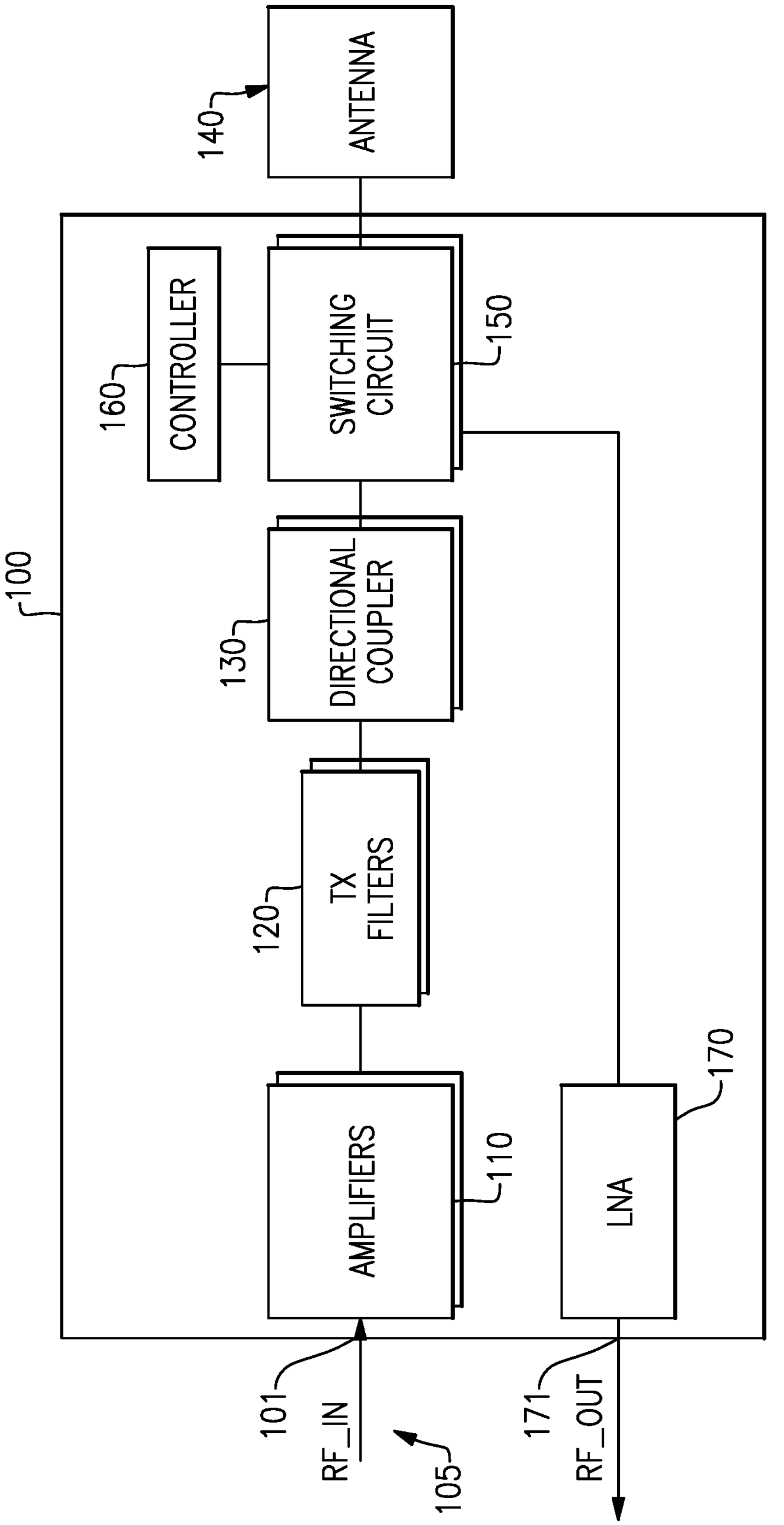
FIG.1 PRIOR ART
FIG. 1 is a block diagram of a front end module.

FIG. 1 is a block diagram illustrating an example of a typical arrangement of a radio-frequency (RF) “front-end” sub-system or module (FEM) 100 as may be used in a communications device, such as a mobile phone, for example, to transmit and receive RF signals. The FEM 100 shown in FIG. 1 includes a transmit path (TX) configured to provide signals to an antenna 140 for transmission and a receive path (RX) to receive signals from the antenna 140. In the transmit path (TX), a power amplifier module 110 provides gain to an RF signal 105 input to the FEM 100 via an input port 101, producing an amplified RF signal. The power amplifier module 110 can include one or more Power Amplifiers (PA).

The FEM 100 can further include a filtering subsystem or module 120, which can include one or more filters. A directional coupler 130 can be used to extract a portion of the power from the RF signal traveling between the power amplifier module 110 and the antenna 140 connected to the FEM 100. The antenna 140 can transmit the RF signal and can also receive RF signals. A switching circuit 150, also referred to as an Antenna Switch Module (ASM), can be used to switch between a transmitting mode and receiving mode of the FEM 100, for example, or between different transmit or receive frequency bands. In certain examples, the switching circuit 150 can be operated under the control of a controller 160. As shown, the directional coupler 130 can be positioned between the filtering subsystem 120 and the switching circuit 150. In other examples, the directional coupler 130 may be positioned between the power amplifier module 110 and the filtering subsystem 120, or between the switching circuit 150 and the antenna 140.

The FEM 100 can also include a receive path (RX) configured to process signals received by the antenna 140 and provide the received signals to a signal processor (e.g., a transceiver) via an output port 171. The receive path (RX) can include one or more Low-Noise Amplifiers (LNA) 170 to amplify the signals received from the antenna 140. Although not shown, the receive path (RX) can also include one or more filters for filtering the received signals.

As described above, directional couplers (e.g., directional coupler 130) can be used in front end module (FEM) products, such as radio transceivers, wireless handsets, and the like. For example, directional couplers can be used to detect and monitor RF output power. When an RF signal generated by an RF source is provided to a load, such as to an antenna, a portion of the RF signal can be reflected from the load back toward the RF source. An RF coupler can be included in a signal path between the RF source and the load to provide an indication of forward RF power of the RF signal traveling from the RF source to the load and/or an indication of reverse RF power reflected from the load. RF couplers include, for example, directional couplers, bidirectional couplers, multi-band couplers (e.g., dual band couplers), and the like.

Figure 2:
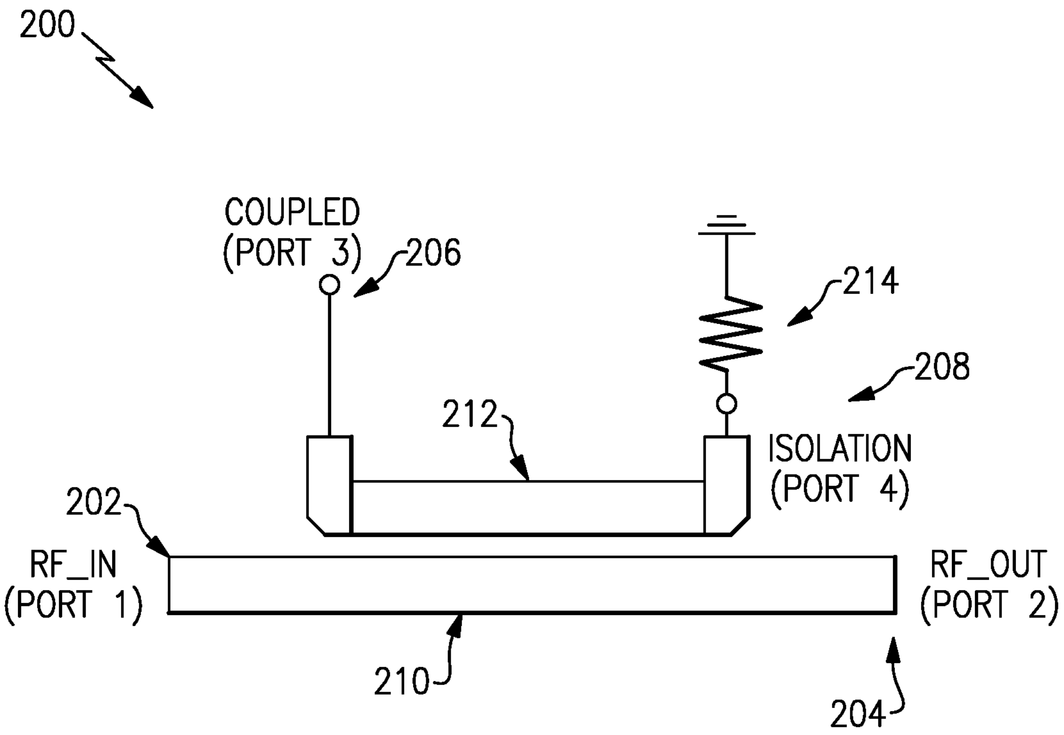
FIG.2 PRIOR ART
FIG. 2 is a schematic diagram of a radio frequency coupler.

Referring to FIG. 2, an RF coupler 200 typically has a power input port 202, a power output port 204, a coupled port 206, and an isolation port 208. The electromagnetic coupling mechanism, which can include inductive or capacitive coupling, is typically provided by two parallel or overlapped transmission lines, such as microstrips, strip lines, coplanar lines, and the like. The transmission line 210 extending between the power input port 202 and the power output port 204 is termed the main line and can provide the majority of the signal from the power input port 202 to the power output port 204. The transmission line 212 extending between the coupled port 206 and the isolation port 208 is termed the coupled line and can be used to extract a portion of the power traveling between the power input port 202 and the power output port 204 for measurement. In some examples, the amount of inductance provided by each of the transmission lines 210, 212 corresponds to the length of each transmission line. In certain examples, inductor coils may be used in place of the transmission lines 210, 212.

When a termination impedance 214 is presented to the isolation port 208 (as shown in FIG. 2), an indication of forward RF power traveling from the power input port 202 to the power output port 204 is provided at the coupled port 206. Similarly, when a termination impedance is presented to the coupled port 206, an indication of reverse RF power traveling from the power output port 204 to the power input port 202 is provided at the coupled port 206, which is now effectively the isolation port for reverse RF power. The termination impedance 214 is typically implemented by a 50 Ohm shunt resistor in a variety of conventional RF couplers; however, in other examples, the termination impedance 214 may provide a different impedance value for a specific frequency of operation. In some examples, the termination impedance 214 may be adjustable to support multiple frequencies of operation.

In one example, the RF coupler 200 is configured to provide a coupling factor corresponding to the mutual coupling of the transmission line 210 (or first inductor coil) to the transmission line 212 (or second inductor coil) and the capacitive coupling of the transmission line 210 (or first inductor coil) to the transmission line 212 (or second inductor coil). In some examples, the coupling factor may be a function of the spacing between the transmission lines 210, 212 and the inductance of the transmission lines 210, 212. In many cases, the coupling factor increases as frequency increases. As the coupling factor increases, more power is coupled from the main line (i.e., transmission line 210) to the coupled line (i.e., transmission line 212), increasing the insertion loss of the RF coupler 200.

As such, RF couplers are typically designed to achieve a desired coupling factor at a specific frequency (or band). However, in some cases, RF couplers may be configured for use in multi-mode, multi-frequency applications. For example, an RF coupler may be included in a FEM configured to operate in a first mode of operation and a second mode of operation (e.g., the FEM 100 of FIG. 1). In one example, the first mode of operation may correspond to low frequency signals (e.g., 1 GHz) and the second mode of operation may correspond to high frequency signals (e.g., 3 GHz). As such, the RF coupler may include one or more termination impedances coupled to the isolation port 208 corresponding to the low and high frequency signals. However, the RF coupler may be designed to achieve a desired coupling factor during the first mode of operation and the coupling factor may be stronger than intended or desired during the second mode of operation. As such, an attenuator may be used to reduce the coupled power during the second mode of operation. Likewise, the insertion loss of the RF coupler may increase during the second mode of operation and the output power of the power amplifier module 110 (or another RF source) may be increased during the second mode of operation to compensate for the increased insertion loss. In some examples, the inclusion of an attenuator to reduce the coupled power during the second mode of operation (i.e., high frequency mode) can increase the footprint of the RF coupler and the overall package size of the FEM 100. In addition, by attenuating the coupled power during the second mode of operation, the accuracy of the output power monitoring provided by the RF coupler may be reduced. For example, the attenuation provided by the attenuator may not compensate the exact amount of excess power corresponding to the increased coupling factor and the exact value of attenuation provided the attenuator may vary. Likewise, a bypass switch may be needed to bypass the attenuator during the first mode of operation (i.e., low frequency mode). Besides occupying extra space, the bypass switch may provide additional loss in the coupled power signal path. In addition, operating the power amplifier module 110 (or another RF source) to provide higher output power during the second mode of operation may reduce the efficiency of the power amplifier module 110 and increase the power consumption of the FEM 100.

In other examples, the RF coupler may be configured with multiple sections of coupled traces that can be connected or separated depending on the mode of operation (e.g., first or second mode of operation). In one example, the coupled traces are configured to be selectively connected via switches to adjust the coupling factor of the RF coupler. In some examples, due to the multiple sections of coupled traces, the RF coupler may have multiple coupled ports and a frequency combiner component (e.g., diplexer, triplexer, n-port multiplexer, etc.) can be used to combine the multiple signals into a single output. However, the inclusion of a frequency combiner component can increase the footprint of the RF coupler and the overall package size of the FEM 100.

Alternatively, to support the first and second modes of operation, the FEM 100 can be configured to include separate RF couplers for each mode. For example, the FEM 100 may include a first RF coupler designed to achieve a desired coupling factor during the first mode of operation and a second RF coupler designed to achieve a desired coupling factor during the second mode of operation. However, the inclusion of separate RF couplers may increase the footprint and/or package size of the FEM 100. In addition, the switching circuitry used to switch between the RF couplers may also increase footprint and/or package size of the FEM 100 any may introduce additional loss in the signal paths.

As such, improved signal couplers are provided herein. In at least one embodiment, the couplers include multiple terminations arranged to provide different coupling factors optimized for a range of signal frequencies. In some examples, each termination is connected to the coupled line of the coupler at a different location to provide different coupling factors. In certain examples, the multiple terminations are configured to maintain a substantially constant coupled power level while minimizing insertion loss over the range of signal frequencies.

Figure 3:
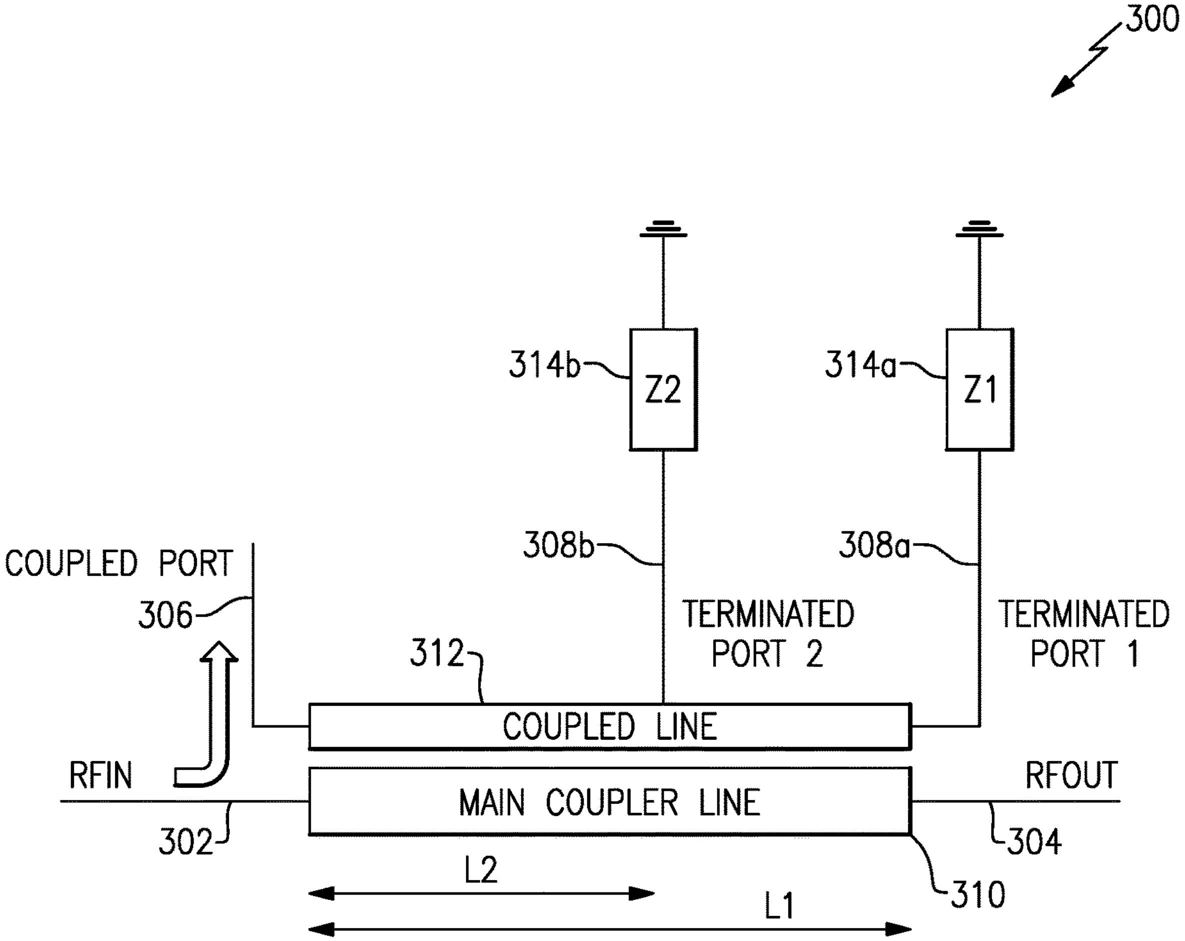
FIG. 3 is a schematic diagram of a radio frequency coupler in accordance with aspects described herein.

FIG. 3 illustrates a schematic diagram of a directional coupler 300 in accordance with aspects described herein. As shown, the directional coupler 300 includes an input port 302, an output port 304, a coupled port 306, a first termination port 308*a*, a second termination port 308*b*, a main transmission line 310, a coupled transmission line 312, a first termination impedance 314*a*, and a second termination impedance 314*b*.

In one example, the main transmission line 310 is coupled between the input port 302 and the output port 304. In some examples, the input port 302 is configured to be coupled to the output of a filter or amplifier of a FEM (e.g., the filtering subsystem 120 or power amplifier module 110 of the FEM 100). Likewise, the output port 304 may be configured to be coupled to the input of a switch/antenna port of a FEM (e.g., the switching circuit 150 or a port connected to the antenna 140 of the FEM 100).

In one example, the coupled transmission line 312 is coupled between the coupled port 306 and the first termination port 308*a*. The distance between the coupled port 306 and the first termination port 308*a* corresponds to a first length L1 (i.e., the length of the coupled transmission line 312). As shown, the second termination port 308*b* is connected to the coupled transmission 312 at a different location than the first termination port 308*a*. In one example, the distance between the coupled port 306 and the second termination port 308*b* corresponds to a second length L2.

In some examples, when a radio frequency signal is applied to the input port 302 of the main transmission line 310, the signal is output via the output port 304 of the main transmission line 310 and a coupled signal is provided to the coupled port 306 of the coupled transmission line 312. As described above, the first and second termination ports 308*a*, 308*b* are connected to the coupled transmission line 312 at different locations. In one example, the first termination impedance 314*a* is optimized (i.e., tuned) for a first frequency and the second termination impedance 314*b* is optimized (i.e., tuned) for a second frequency. As such, when a radio frequency signal is applied to the input port 302 having the first frequency, the coupled transmission line 312 has an effective length corresponding to the distance between the coupled port 306 and the first termination port 308*a* (i.e., the first length L1). Likewise, when a radio frequency signal is applied to the input port 302 having the second frequency, the coupled transmission line 312 has an effective length corresponding to the distance between the coupled port 306 and the second termination port 308*b* (i.e., the second length L2).

In one example, the first frequency is lower than the second frequency. As such, the directional coupler 300 is configured to provide different coupling factors optimized for each of the first and second frequencies. For example, when a radio frequency signal having the first frequency is applied to the input port 302, the directional coupler 300 is configured to provide a first coupling factor $CF_1$ corresponding to the first length L1. Likewise, when a radio frequency signal having the second frequency is applied to the input port 302, the directional coupler 300 is configured to provide a second coupling factor $CF_2$ corresponding to the second length L2. As shown in FIG. 3, the effective length of the coupled transmission line 312 for a radio frequency signal having the first frequency (i.e., $L_1$) is longer than the effective length of the coupled transmission line 312 for a radio frequency signal having the second frequency (i.e., $L_2$). As such, the first coupling factor $CF_1$ is larger (or stronger) than the second coupling factor $CF_2$. Being that the coupling factor increases with frequency, the stronger coupling factor ($CF_1$) and the weaker coupling factor ($CF_2$) may have substantially similar values at the first and second frequencies, respectively.

Figure 4:
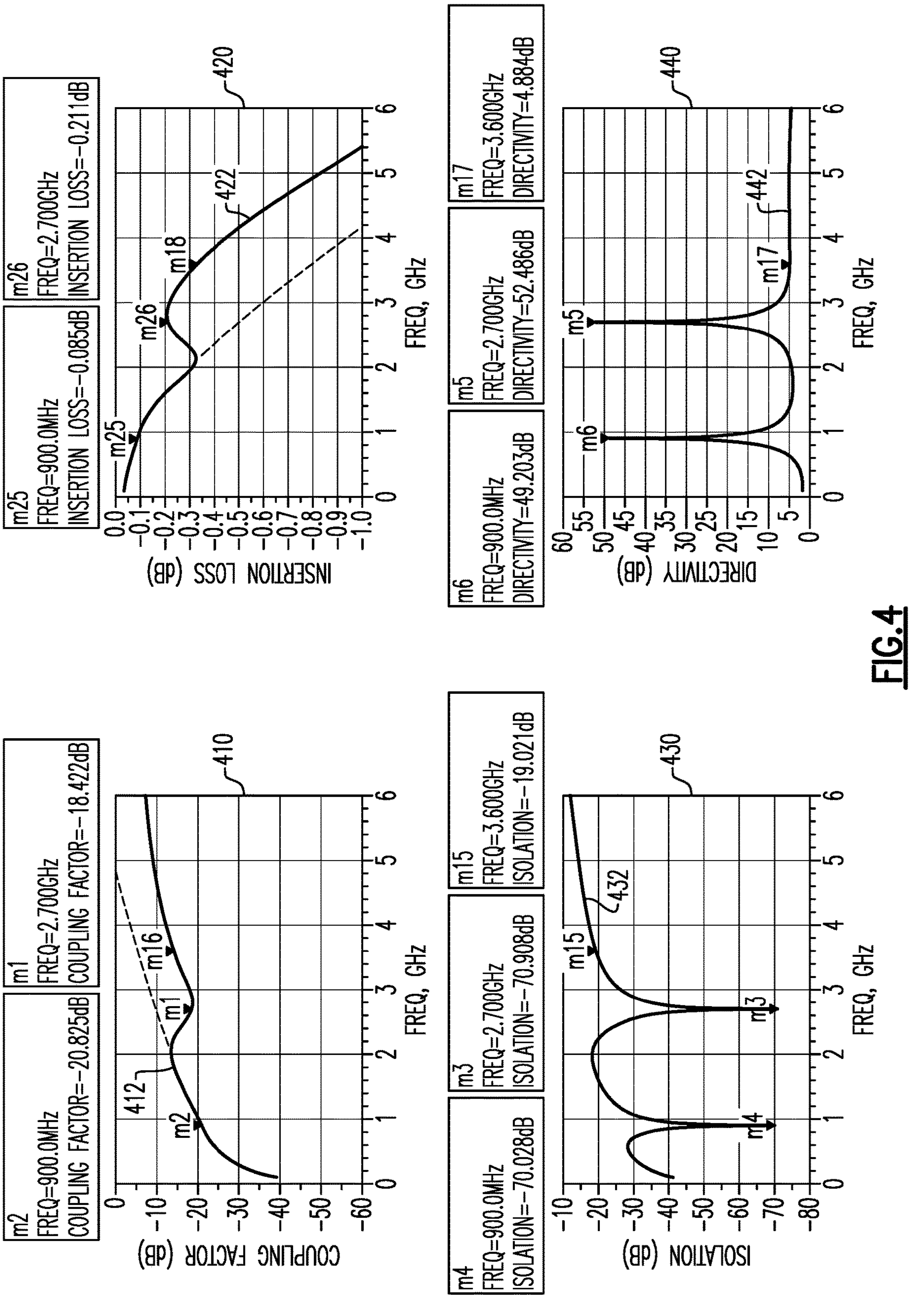
FIG. 4 is a set of graphs illustrating performance of a radio frequency coupler in accordance with aspects described herein.

FIG. 4 illustrates several graphs of simulated performance results of a directional coupler in accordance with aspects described herein. Graph 410 represents the coupling factor of the directional coupler 300, graph 420 represents the insertion loss of the directional coupler 300, graph 430 represents the isolation of the directional coupler 300, and graph 440 represents the directivity of the directional coupler 300. In one example, the simulated performance results correspond to a configuration of the directional coupler 300 optimized to support a first frequency of 900 MHz and a second frequency of 2.7 GHz.

In one example, the trace 412 in graph 410 represents the coupling factor of the directional coupler 300 over a frequency sweep of 0 GHz to 6 GHz. As shown, due to the different locations of the first and second termination ports 308*a*, 308*b* and the values of the first and second termination impedances 314*a*, 314*b*, the coupling factor at the first frequency (i.e., $CF_1$) and the coupling factor at the second frequency (i.e., $CF_2$) are substantially similar. For example, the directional coupler 300 may provide a coupling factor of approximately −20.8 dB at 900 MHz (i.e., the first frequency) and a coupling factor of approximately −18.4 dB at 2.7 GHz (i.e., the second frequency). In certain examples, the directional coupler 300 may provide coupling factors that vary by less than ±2.5 dB between the first and second frequencies. In some examples, the substantially similar coupling factors allow the directional coupler 300 to provide coupled power to the coupled port 306 of the coupled transmission line 312 at a substantially constant power level for both the first and second frequencies. For comparison, the dashed trace shown in graph 410 represents the coupling factor of an example single-termination coupler (e.g., RF coupler 200 of FIG. 2). As shown, the coupling factor of the single-termination coupler at second frequency (2.7 GHz) is approximately 10 dB higher than the coupling factor at the first frequency (900 MHz). As such, the single-termination coupler may provide undesirable performance at the second frequency relative to the first frequency, or vice versa.

In one example, the trace 422 in graph 420 represents the insertion loss of the directional coupler 300 over a frequency sweep of 0 GHz to 6 GHz. As shown, due to the substantially similar coupling factors at each of the first and second frequencies, the insertion loss of the directional coupler 300 can be minimized at the first and second frequencies. For example, the directional coupler 300 may have an insertion loss of approximately −0.09 dB at 900 MHz (i.e., the first frequency) and an insertion loss of approximately −0.2 dB at 2.7 GHz (i.e., the second frequency). In certain examples, the insertion loss of the directional coupler 300 may vary by less than ±0.15 dB between the first and second frequencies. In some examples, by minimizing insertion loss, radio frequency signals can be applied to the input port 302 of the main transmission line 310 with substantially constant power levels for both the first and second frequencies. In addition, return loss in the main transmission line 310 may remain substantially constant between the first and second frequencies. For comparison, the dashed trace shown in graph 420 represents the insertion loss of an example single-termination coupler (e.g., RF coupler 200 of FIG. 2). As shown, the insertion loss of the single-termination coupler at the second frequency (2.7 GHz) is approximately 0.4 dB larger than the insertion loss at the first frequency (900 MHz). As such, the single-termination coupler may provide undesirable performance at the second frequency relative to the first frequency, or vice versa.

In one example, the trace 432 in graph 430 represents the isolation of the directional coupler 300 over a frequency sweep of 0 GHz to 6 GHz. The isolation of the directional coupler 300 corresponds to the difference in signal power between the input port 302 and the first and second termination ports 308*a*, 308*b*. As shown, due to the different locations of the first and second termination ports 308*a*, 308*b* and the values of the first and second termination impedances 314*a*, 314*b*, the directional coupler 300 is configured to provide maximum isolation at the first and second frequencies. For example, at 900 MHz (i.e., the first frequency) the directional coupler 300 may provide approximately −70.0 dB of isolation. Likewise, at 2.7 GHz (i.e., the second frequency) the directional coupler 300 may provide approximately −70.9 dB of isolation. For comparison, at a non-optimized frequency (e.g., 3.6 GHz), the directional coupler 300 may provide approximately −19.0 dB of isolation. In certain examples, the amount of isolation provided by the directional coupler 300 may vary by less than ±1 dB between the first and second frequencies.

Similarly, the trace 442 in graph 440 represents the directivity of the directional coupler 300 over a frequency sweep of 0 GHz to 6 GHz. The directivity of the directional coupler 300 corresponds to the difference between the coupling factor (e.g., graph 410) and the amount of isolation provided by the coupler (e.g., graph 430). As shown, due to the different locations of the first and second termination ports 308*a*, 308*b* and the values of the first and second termination impedances 314*a*, 314*b*, the directional coupler 300 is configured with maximum directivity at the first and second frequencies. For example, at 900 MHz (i.e., the first frequency) the directivity of the directional coupler 300 may be approximately 49.2 dB. Likewise, at 2.7 GHz (i.e., the second frequency) the directivity of the coupler 300 may be approximately 52.5 dB. For comparison, at a non-optimized frequency (e.g., 3.6 GHz), the directivity of the directional coupler 300 may be approximately 4.9 dB. In certain examples, the directivity of the directional coupler 300 may vary by less than ±3.5 dB between the first and second frequencies.

As described above, the directional coupler 300 can provide optimized coupling factors for each of the first and second frequencies. In some examples, the optimized coupling factors may be selected to minimize insertion loss at each of the first and second frequencies while maintaining a substantially constant power level of the coupled signal provided to the coupled port 306. However, in other examples, the optimized coupling factors may be selected to provide different performance metrics (e.g., insertion loss, coupled power levels) at each of the first and second frequencies. In some examples, the directional coupler 300 allows multiple signals to be coupled at the same time (e.g., carrier aggregation). As such, the directional coupler 300 may be integrated in devices (e.g., the FEM 100) without using extra components (e.g., attenuators) to regulate the power level of the coupled signal or frequency combiner components (e.g., multiplexers) to combine multiple output signals. Likewise, the RF source providing the input signal to the directional coupler 300 (e.g., the power amplifier module 110) can be operated at a constant output power level over frequency, improving the efficiency of the power amplifier module 110 and/or the power consumption of the FEM 100. In addition, the compact footprint of the directional coupler 300 may allow the footprint or package size of the FEM 100 to be reduced.

Figure 5:
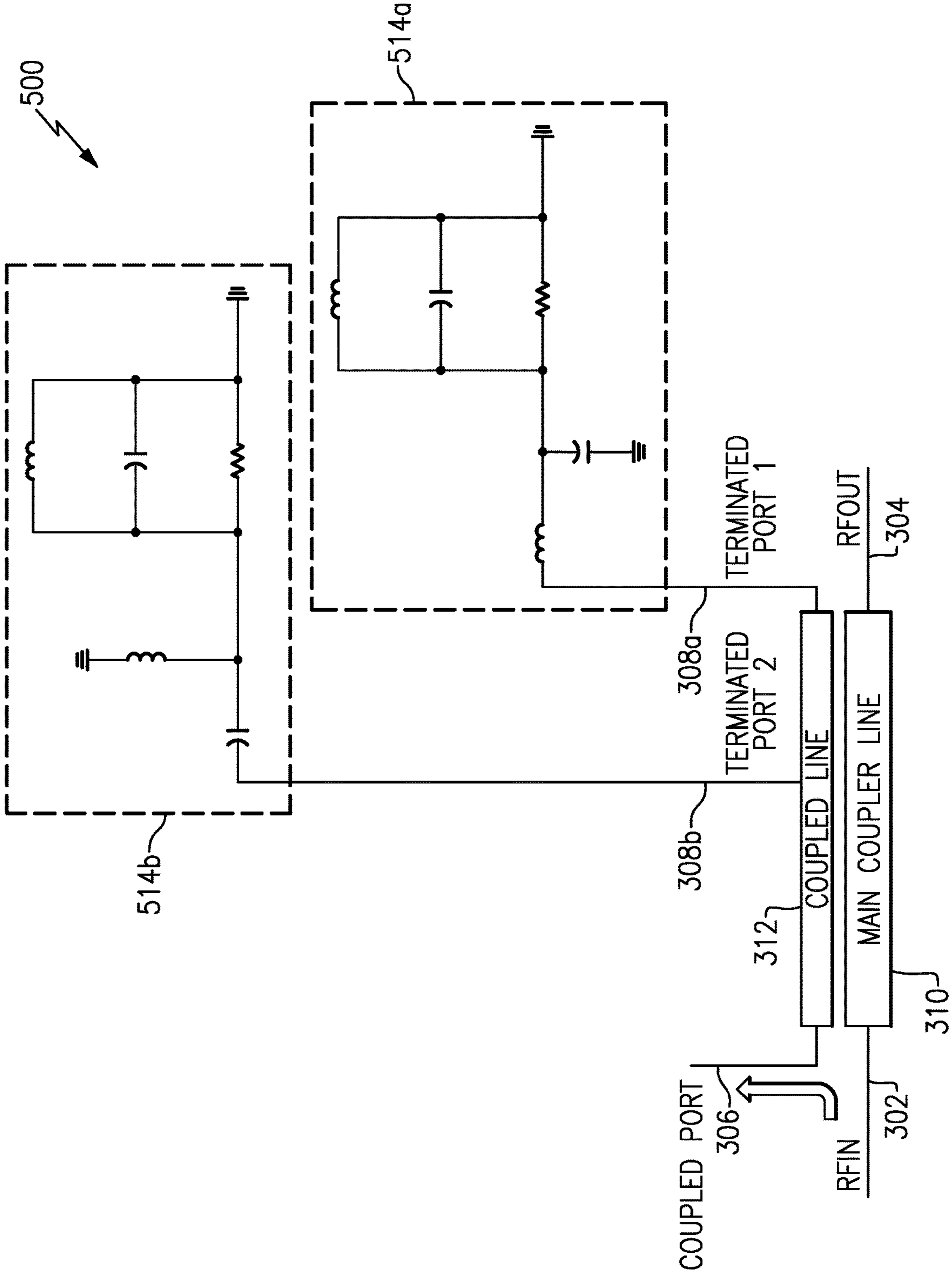
FIG. 5 is a schematic diagram of a radio frequency coupler in accordance with aspects described herein.

In some examples, the first and second termination impedances 314*a*, 314*b* include at least one RLC (resistive-inductive-capacitive) circuit that includes one or more resistive, inductive, or capacitive elements, or a combination thereof. For example, FIG. 5 a schematic diagram of a directional coupler 500 in accordance with aspects described herein. The directional coupler 500 corresponds to the directional coupler 300 of FIG. 3 having first and second termination impedances 514*a*, 514*b* configured as RLC circuits.

In one example, the first termination impedance 514*a* is configured to provide an optimized termination impedance for the first frequency (e.g., 900 MHz) and the second termination impedance 514*b* is configured to provide an optimized termination impedance for the second frequency (e.g., 2.7 GHz). In some examples, the first termination impedance 514*a* may provide an optimized termination impedance by matching the characteristic impedance of the coupled transmission line 312 at the first frequency. Likewise, the second termination impedance 514*b* may provide an optimized termination impedance by matching the characteristic impedance of the coupled transmission line 312 (or the $L_2$ portion of the coupled transmission line 312) at the second frequency.

In some examples, the first and second termination impedances 514*a*, 514*b* can be permanently connected to the coupled transmission line 312. For example, the first and second termination impedances 514*a*, 514*b* may be connected directly to the coupled transmission line 312 via transmission lines or conductive lines (e.g., microstrips, strip lines, coplanar lines, etc.). While the first and second termination impedances 514*a*, 514*b* are described above as RLC circuits permanently connected to the coupled transmission line 312, in other examples, the termination impedances may be configured differently and/or connected to the coupled transmission line 312 in a different manner.

Figure 6:
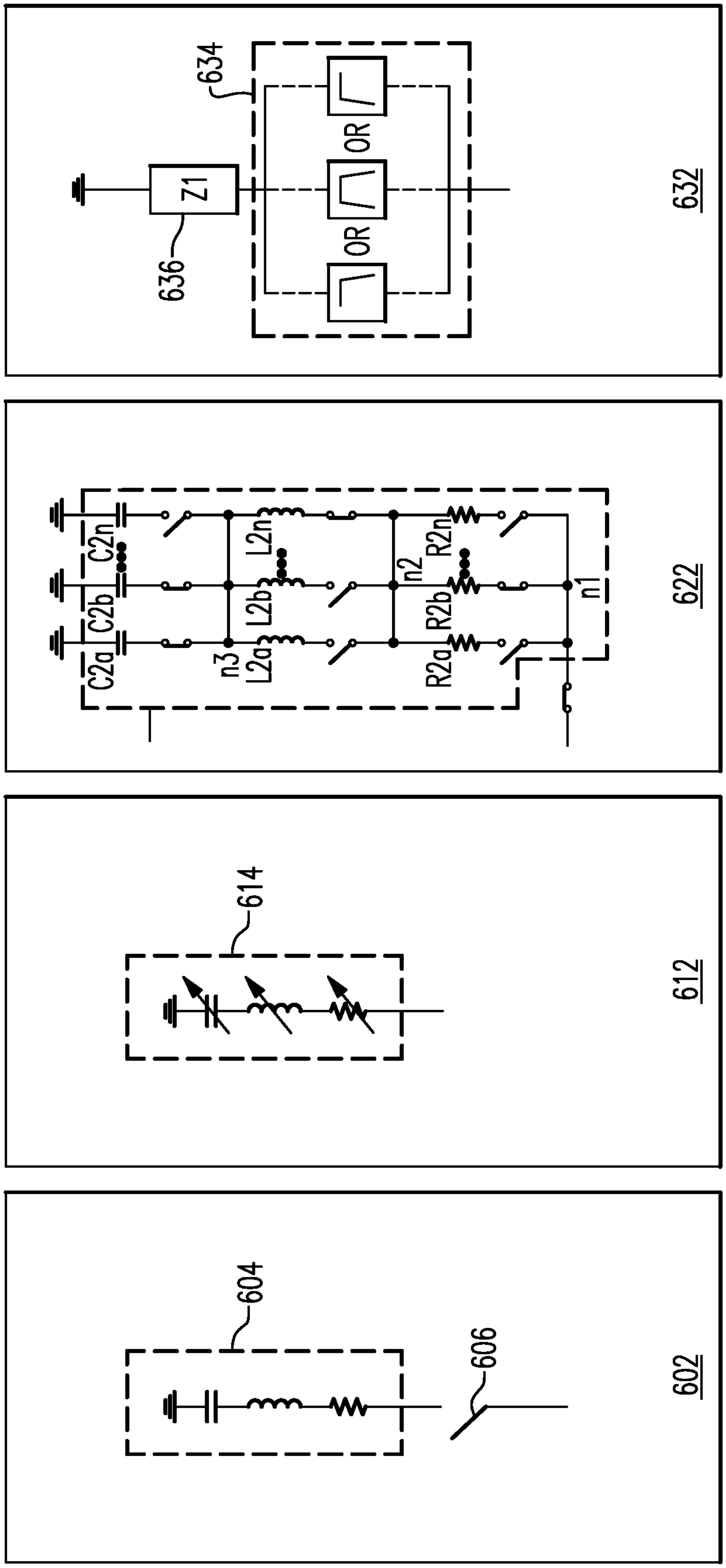
FIG. 6 is a schematic diagram of several impedance termination arrangements in accordance with aspects described herein.

FIG. 6 illustrates several termination impedance arrangements in accordance with aspects described herein. In some examples, the first termination impedance 314*a* and/or the second termination impedance 314*b* of the directional coupler 300 of FIG. 3 can be configured as any of the termination impedance arrangements shown FIG. 6.

In one example, a first termination impedance arrangement 602 includes an RLC circuit (or network) 604 and a switch 606. Similar to the first and second termination impedances 514*a*, 514*b* of FIG. 5, the RLC circuit 604 may be configured to match the characteristic impedance of the coupled transmission line 312 at a specific frequency (e.g., the first or second frequency). In some examples, the switch 606 can be operated to selectively connect or disconnect the RLC circuit 604 from the coupled transmission line 312. For example, if the first termination impedance 314*a* is configured as the first termination impedance arrangement 602, the switch 606 may be operated to connect the RLC circuit 604 to the first termination port 308*a* when a radio frequency signal having the first frequency is received at the input port 302 of the directional coupler 300. Likewise, the switch 606 may be operated to disconnect the RLC circuit 604 from the first termination port 308*a* when a radio frequency signal having the second frequency is received at the input port 302 of the directional coupler 300.

In one example, a second termination impedance arrangement 612 includes an adjustable RLC circuit (or network) 614. In some examples, the adjustable RLC circuit 614 includes one or more tunable resistive, inductive, or capacitive elements, or a combination thereof. In certain examples, the adjustable RLC circuit 614 can be adjusted/tuned based on a mode of operation of the directional coupler 300. For example, if the first termination impedance 314*a* is configured as the termination impedance arrangement 612, the adjustable RLC circuit 614 may be adjusted to provide a first termination impedance optimized for a specific frequency (e.g., the first frequency) during a first mode of operation. Likewise, during a second mode of operation, the adjustable RLC circuit 614 may be adjusted to provide a second termination impedance optimized for a different frequency (e.g., a third frequency). In some examples, the termination impedance arrangement 612 can be permanently connected to the coupled transmission line 312; however, in other examples, the termination impedance arrangement 612 can be selectively connected to the coupled transmission line 312 (e.g., via a switch).

In one example, a third termination impedance arrangement 622 is configured as an adjustable termination circuit. In some examples, the termination impedance arrangement 622 includes one or more switches that are controlled to select different combinations of termination impedance values. Similar to the termination impedance arrangement 612, the termination impedance arrangement 622 can be adjusted/tuned based on a mode of operation of the directional coupler 300. Examples of such adjustable termination circuits are described in U.S. Pat. No. 9,614,269 to Srirattana et al. titled "RF COUPLER WITH ADJUSTABLE TERMINATION IMPEDANCE," which is hereby incorporated herein by reference.

In one example, a fourth termination impedance arrangement 632 includes a filter 634 and a termination impedance 636. In some examples, the filter 634 is configured to provide signals at a specific frequency (or frequency band) to the termination impedance 636. For example, if the first termination impedance 314*a* is configured as the termination impedance arrangement 632, the filter 634 may be configured to pass radio frequency signals at the first frequency while blocking radio frequency signals at different frequencies (e.g., the second frequency). In certain examples, the filter 634 can provide improved isolation between termination ports (e.g., the first and second termination ports 308*a*, 308*b*). The filter 634 can be configured as a low pass filter, a high pass filter, or a bandpass filter. In some examples, the filter 634 can be permanently connected to the coupled transmission line 312; however, in other examples, the filter 634 can be selectively connected to the coupled transmission line 312 (e.g., via a switch). The termination impedance 636 may be configured as a fixed or adjustable termination impedance. For example, the termination impedance 636 may be configured as any of the termination impedance arrangements 602, 612, and 622 or any other type of termination impedance.

Figure 7:
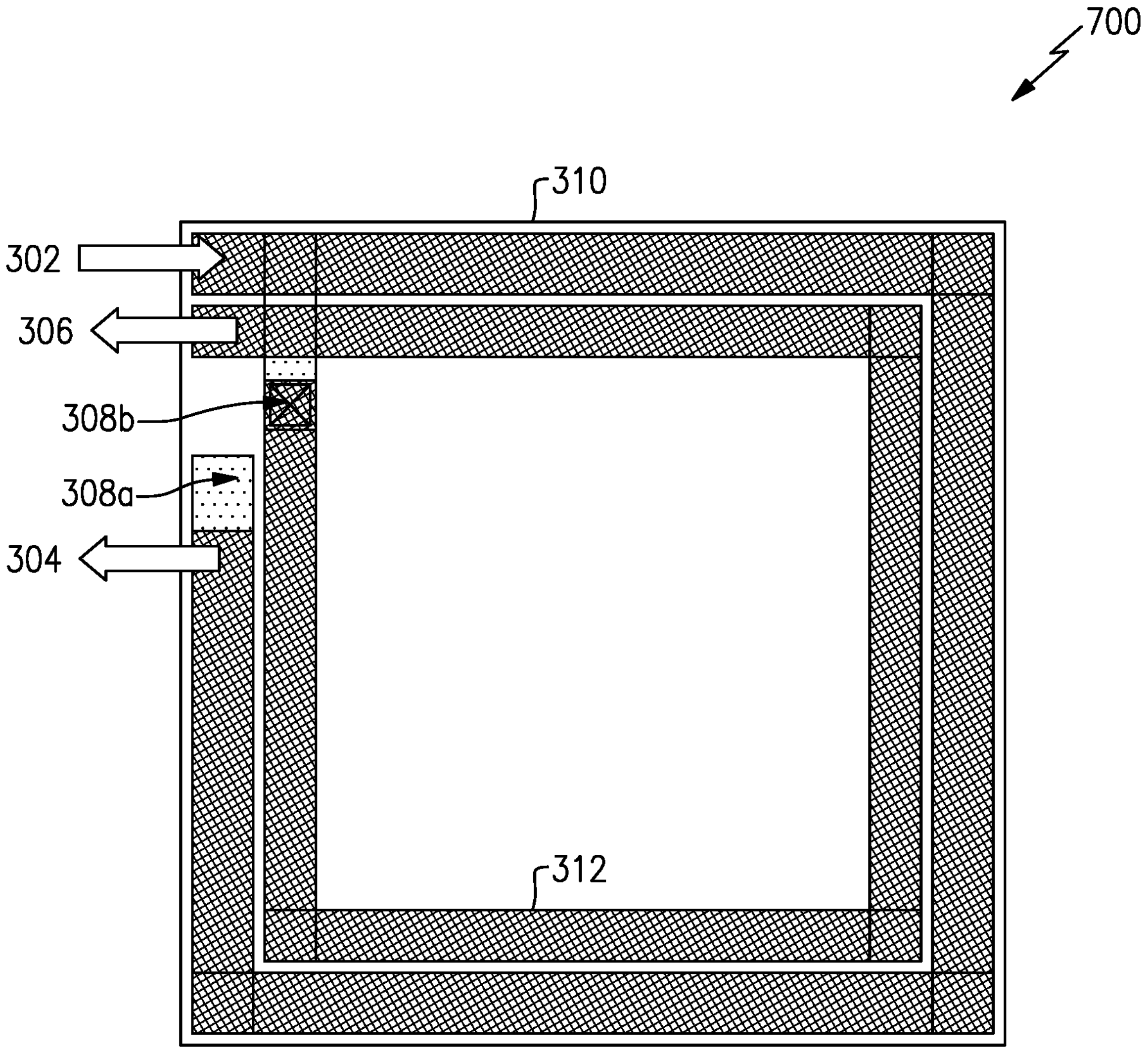
FIG. 7 is a layout of a radio frequency coupler in accordance with aspects described herein.

As described above, the directional coupler 300 can be arranged in a compact layout. For example, FIG. 7 illustrates a layout 700 of the directional coupler 300 in accordance with aspects described herein. As shown, the main transmission line 310 and the coupled transmission line 312 can be arranged in a compact layout. In one example, the main transmission line 310 is routed between the input port 302 and the output port 304 on a first layer. A first portion (i.e., L2) of the coupled transmission line 312 is routed on the first layer between the coupled port 306 and the second termination port 308*b*. While not shown, a second portion (i.e., difference between L1 and L2) of the coupled transmission line 312 is routed on a second layer between the first termination port 308*a* and the second termination port 308*b*. In some examples, the first and second portions of the coupled transmission line 312 can be connected using a conductive via structure. In other examples, the coupler 300 may be arranged or routed differently. For example, the entire coupled transmission line 312 may be routed on the same layer (e.g., the first or second layer).

While the directional coupler 300 is described above as having a unidirectional configuration with two termination ports, it should be appreciated that the directional coupler 300 may be configured differently. For example, the directional coupler 300 can be configured as a bidirectional coupler and/or may include more than two termination ports.

Figure 8:
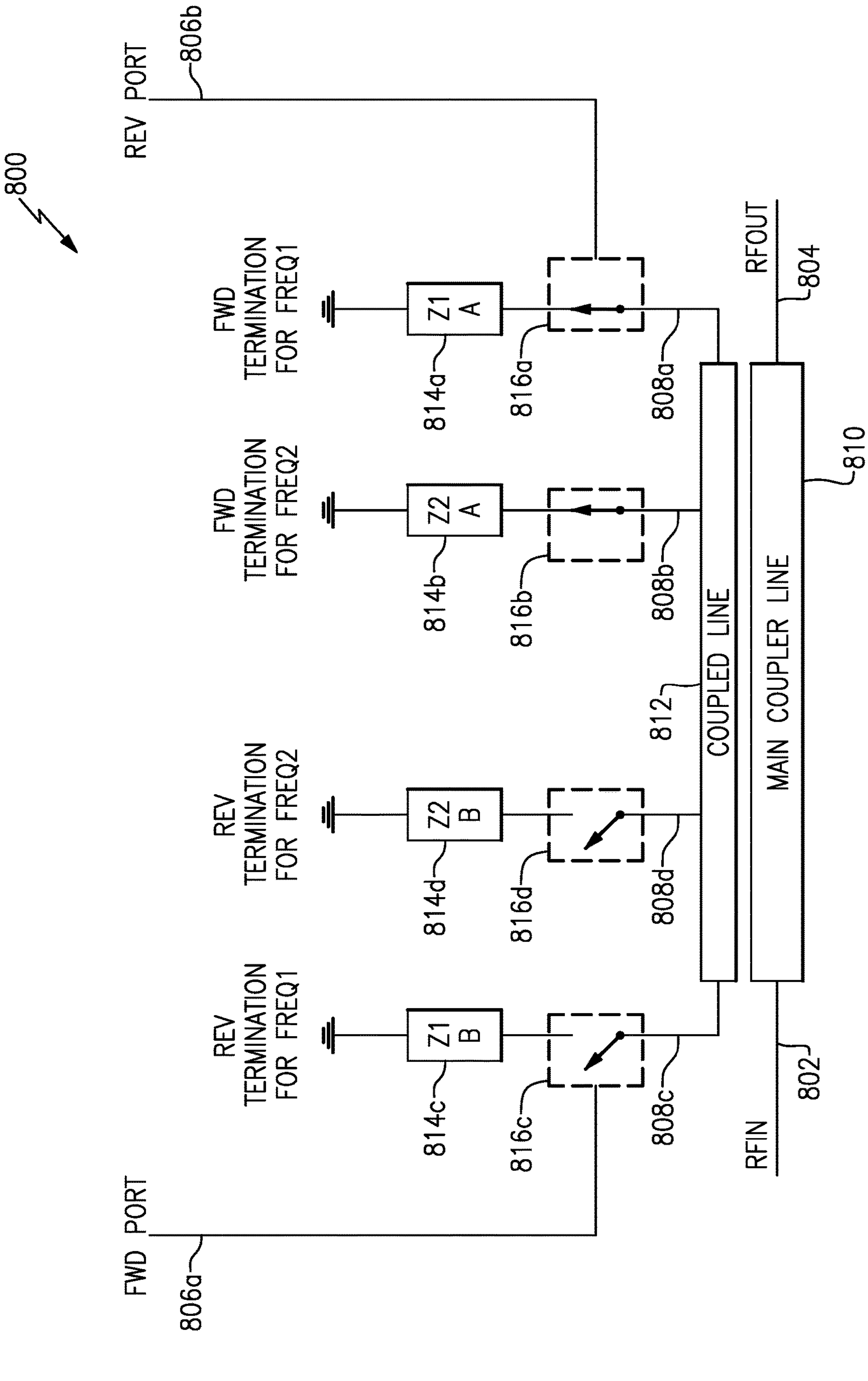
FIG. 8 is a schematic diagram of a radio frequency coupler in accordance with aspects described herein.

FIG. 8 is a schematic diagram of a bidirectional coupler 800 in accordance with aspects described herein. As shown, the bidirectional coupler 800 includes an input port 802, an output port 804, a forward coupled port 806*a*, a reverse coupled port 806*b*, a first forward termination port 808*a*, a second forward termination port 808*b*, a first reverse termination port 808*c*, a second reverse termination port 808*d*, a main transmission line 810, a coupled transmission line 812, a first forward termination impedance 814*a*, a second forward termination impedance 814*b*, a first reverse termination impedance 814*c*, a second reverse termination impedance 814*d*, a first switch 816*a*, a second switch 816*b*, a third switch 816*c*, and a fourth switch 816*d*. The switches 816*a*-816*d* are operated to selectively couple the termination impedances 814*a*-814*d* to the coupled transmission line 812.

In some examples, when a radio frequency signal is applied to the input port 802 of the main transmission line 810, the signal is output via output port 804 of the main transmission line 810 and a coupled signal is provided to the forward coupled port 806*a* of the coupled transmission line 812. Similarly, when a radio frequency signal is applied to the output port 804 of the main transmission line 810, the signal is output via the input port 802 of the main transmission line 810 and a coupled signal is provided to the reverse coupled port 806*b* of the coupled transmission line 812.

In one example, the termination impedances 814*a*-814*d* are optimized (i.e., tuned) for specific frequencies (or frequency bands). For example, the first forward termination impedance 814*a* and the first reverse termination impedance 814*c* may be optimized for a first frequency and the second forward termination impedance 814*b* and the second reverse termination impedance 814*d* may be optimized for a second frequency. Each of the termination impedances 814*a*-814*d* may be configured as a fixed or adjustable termination impedance. For example, each of the termination impedances 814*a*-814*d* may be configured as any of the termination impedance arrangements 602, 612, and 622 of FIG. 6 or any other type of termination impedance.

As described above, the switches 816*a*-816*d* can be operated to selectively couple the termination impedances 814*a*-814*d* to the coupled transmission line 312. In some examples, the bidirectional coupler 800 may be configured to operate in different modes of operation corresponding to the direction of operation (i.e., forward or reverse).

For example, in a forward mode of operation, the third switch 816*c* may be controlled to couple the forward coupled port 806*a* to the coupled transmission line 812. The first switch 816*a* may be controlled to couple the first forward termination impedance 814*a* to the first forward termination port 808*a* and the second switch 816*b* may be controlled to couple the second forward termination impedance 814*b* to the second forward termination port 808*b*. Likewise, in a reverse mode of operation, the first switch 816*a* may be controlled to couple the reverse coupled port 806*b* to the coupled transmission line 312. The third switch 816*c* may be controlled to couple the first reverse termination impedance 814*c* to the first reverse termination port 808*c* and the fourth switch 816*d* may be controlled to couple the second reverse termination impedance 814*d* to the second reverse termination port 808*d*. In some examples, the switches 816*a*-816*d* can be operated or controlled in unison (i.e., together); however, in other examples, the switches 816*a*-816*d* can be operated or controlled individually.

Similar to the directional coupler 300 of FIG. 3, the bidirectional coupler 800 can provide optimized coupling factors for each of the first and second frequencies to achieve desired performance at each of the first and second frequencies. In some examples, the bidirectional coupler 800 allows multiple signals having different frequencies to be coupled at the same time (e.g., carrier aggregation). As such, the bidirectional coupler 800 may be integrated in devices (e.g., the FEM 100) without using extra components (e.g., attenuators) to regulate the power level of the coupled signal or frequency combiner components (e.g., multiplexers) to combine multiple output signals. Likewise, the RF source providing the input signal to the bidirectional coupler 800 (e.g., the power amplifier module 110) can be operated at a constant output power level over frequency, improving the efficiency of the power amplifier module 110 and/or the power consumption of the FEM 100. In addition, the compact footprint of the bidirectional coupler 800 may allow the footprint or package size of the FEM 100 to be reduced.

Figure 9:
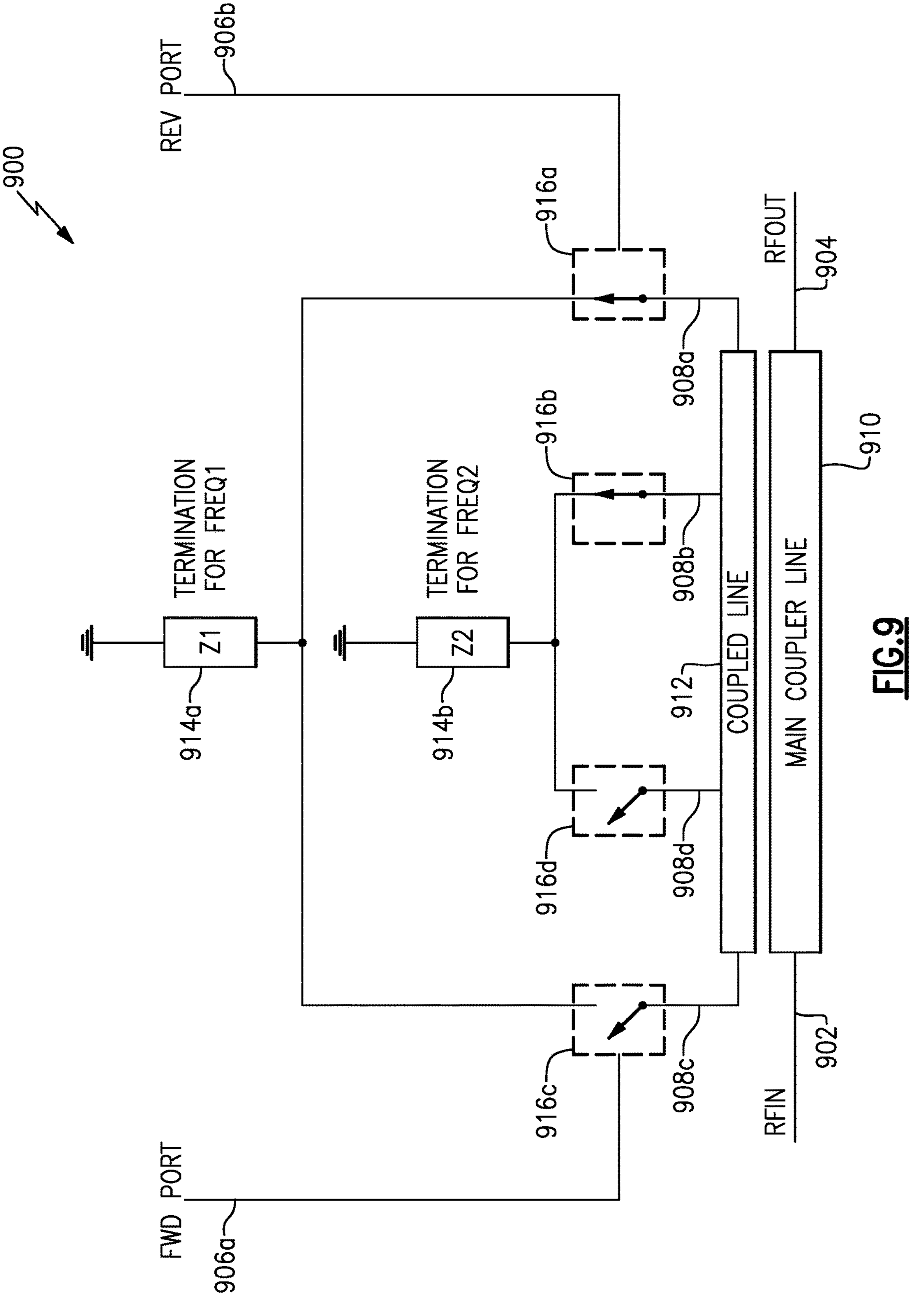
FIG. 9 is a schematic diagram of a radio frequency coupler in accordance with aspects described herein.

FIG. 9 is a schematic diagram of a bidirectional coupler 900 in accordance with aspects described herein. In one example, the bidirectional coupler 900 is substantially the same as the bidirectional coupler 800 of FIG. 8, except the bidirectional coupler 900 is configured to use common termination impedances for both the forward and reverse modes of operation. As such, the number of different termination impedances can be reduced relative to the bidirectional coupler 800 of FIG. 8. As shown, the bidirectional coupler 900 includes an input port 902, an output port 904, a forward coupled port 906*a*, a reverse coupled port 906*b*, a first forward termination port 908*a*, a second forward termination port 908*b*, a first reverse termination port 908*c*, a second reverse termination port 908*d*, a main transmission line 910, a coupled transmission line 912, a first termination impedance 914*a*, a second termination impedance 914*b*, a first switch 916*a*, a second switch 916*b*, a third switch 916*c*, and a fourth switch 916*d*. The switches 916*a*-916*d* are operated to selectively couple the termination impedances 914*a*, 914*b* to the coupled transmission line 912.

In some examples, when a radio frequency signal is applied to the input port 902 of the main transmission line 910, the signal is output via output port 904 of the main transmission line 910 and a coupled signal is provided to the forward coupled port 906*a* of the coupled transmission line 912. Similarly, when a radio frequency signal is applied to the output port 904 of the main transmission line 910, the signal is output via the input port 902 of the main transmission line 910 and a coupled signal is provided to the reverse coupled port 906*b* of the coupled transmission line 912.

In one example, the termination impedances 914*a*, 914*b* are optimized (i.e., tuned) for specific frequencies (or frequency bands). For example, the first termination impedance 914*a* may be optimized for a first frequency and the second termination impedance 914*b* may be optimized for a second frequency. Each of the termination impedances 914*a*, 914*b* may be configured as a fixed or adjustable termination impedance. For example, each of the termination impedances 914*a*, 914*b* may be configured as any of the termination impedance arrangements 602, 612, and 622 of FIG. 6 or any other type of termination impedance.

As described above, the switches 916*a*-916*d* can be operated to selectively couple the termination impedances 914*a*, 914*b* to the coupled transmission line 912. In some examples, the bidirectional coupler 900 may be configured to operate in different modes of operation corresponding to the direction of operation (i.e., forward or reverse).

For example, in a forward mode of operation, the third switch 916*c* may be controlled to couple the forward coupled port 906*a* to the coupled transmission line 912. The first switch 916*a* may be controlled to couple the first termination impedance 914*a* to the first forward termination port 908*a* and the second switch 916*b* may be controlled to couple the second termination impedances 914*b* to the second forward termination port 908*b*. Likewise, in a reverse mode of operation, the first switch 916*a* may be controlled to couple the reverse coupled port 906*b* to the coupled transmission line 912. The third switch 916*c* may be controlled to couple the first termination impedance 914*a* to the first reverse termination port 908*c* and the fourth switch 916*d* may be controlled to couple the second termination impedances 914*b* to the second reverse termination port 908*d*. In some examples, the switches 916*a*-916*d* can be operated or controlled in unison (i.e., together); however, in other examples, the switches 916*a*-916*d* can be operated or controlled individually.

Similar to the directional coupler 300 of FIG. 3, the bidirectional coupler 900 can provide optimized coupling factors for each of the first and second frequencies to achieve desired performance at each of the first and second frequencies. In some examples, the bidirectional coupler 900 allows multiple signals having different frequencies to be coupled at the same time (e.g., carrier aggregation). As such, the bidirectional coupler 900 may be integrated in devices (e.g., the FEM 100) without using extra components (e.g., attenuators) to regulate the power level of the coupled signal or frequency combiner components (e.g., multiplexers) to combine multiple output signals. Likewise, the RF source providing the input signal to the bidirectional coupler 900 (e.g., the power amplifier module 110) can be operated at a constant output power level over frequency, improving the efficiency of the power amplifier module 110 and/or the power consumption of the FEM 100. In addition, being that the bidirectional coupler 900 is configured with common termination impedances, the compact footprint of the bidirectional coupler 900 may allow the footprint or package size of the FEM 100 to be reduced even further.

While the couplers 300, 500, 800, and 900 are described above as being optimized for two signal frequencies (i.e., the first and second frequencies), it should be appreciated that the couplers may be optimized for more than two signal frequencies.

Figure 10:
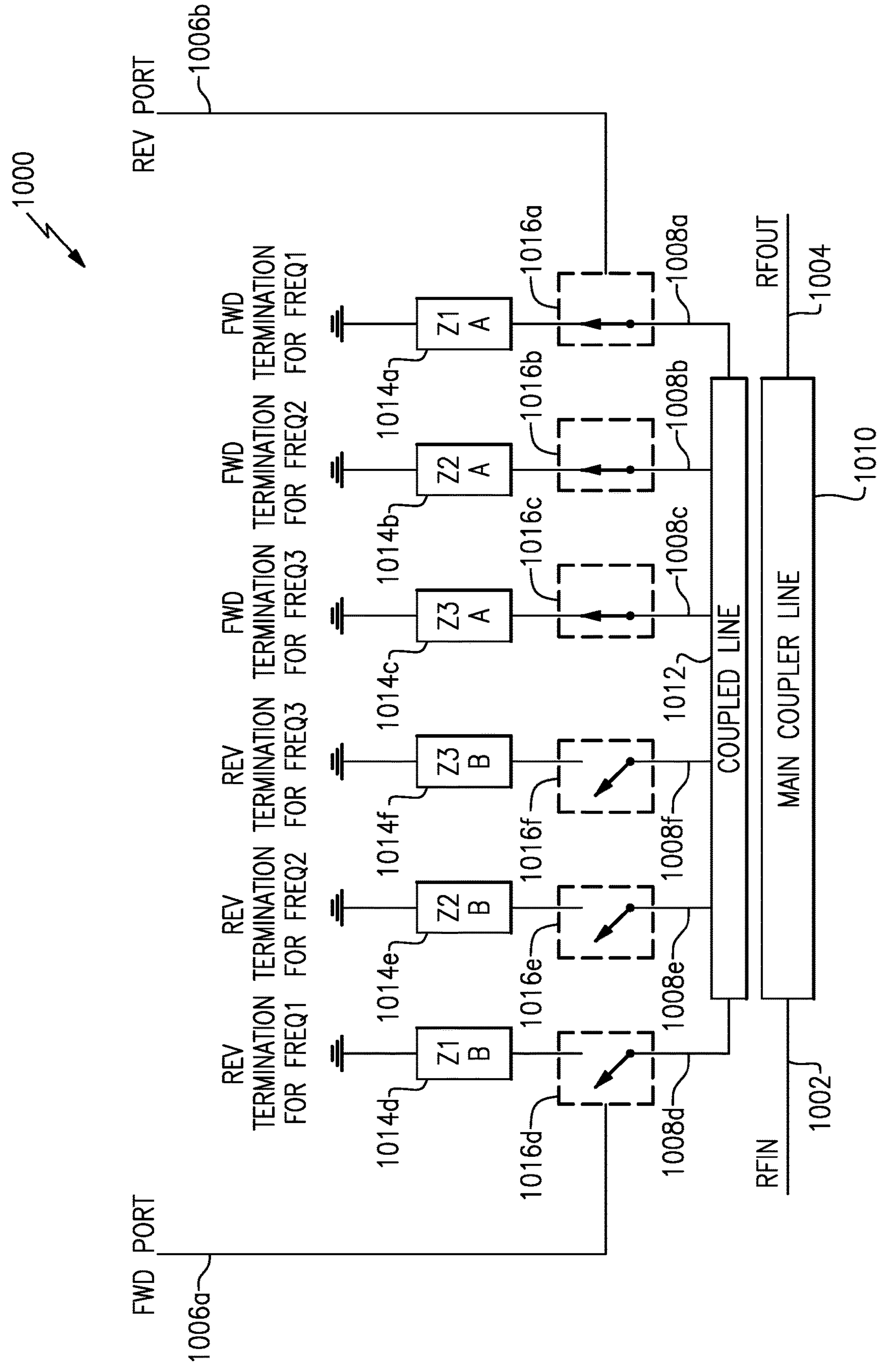
FIG. 10 is a schematic diagram of a radio frequency coupler in accordance with aspects described herein.

FIG. 10 is a schematic diagram of a bidirectional coupler 1000 in accordance with aspects described herein. In one example, the bidirectional coupler 1000 is substantially the same as the bidirectional coupler 800 of FIG. 8, except the bidirectional coupler 1000 is configured to support three signal frequencies (or frequency bands). As shown, the bidirectional coupler 1000 includes an input port 1002, an output port 1004, a forward coupled port 1006*a*, a reverse coupled port 1006*b*, a first forward termination port 1008*a*, a second forward termination port 1008*b*, a third forward termination port 1008*c*, a first reverse termination port 1008*d*, a second reverse termination port 1008*e*, a third reverse termination port 1008*f*, a main transmission line 1010, a coupled transmission line 1012, a first forward termination impedance 1014*a*, a second forward termination impedance 1014*b*, a third forward termination impedance 1014*c*, a first reverse termination impedance 1014*d*, a second reverse termination impedance 1014*e*, a third reverse termination impedance 1014*f*, a first switch 1016*a*, a second switch 1016*b*, a third switch 1016*c*, a fourth switch 1016*d*, a fifth switch 1016*e*, and a sixth switch 1016*f*. The switches 1016*a*-1016*f* are operated to selectively couple the termination impedances 1014*a*-1014*f* to the coupled transmission line 1012.

In some examples, when a radio frequency signal is applied to the input port 1002 of the main transmission line 1010, the signal is output via output port 1004 of the main transmission line 1010 and a coupled signal is provided to the forward coupled port 1006*a* of the coupled transmission line 1012. Similarly, when a radio frequency signal is applied to the output port 1004 of the main transmission line 1010, the signal is output via the input port 1002 of the main transmission line 1010 and a coupled signal is provided to the reverse coupled port 1006*b* of the coupled transmission line 1012.

In one example, the termination impedances 1014*a*-1014*f* are optimized (i.e., tuned) for specific frequencies (or frequency bands). For example, the first forward termination impedance 1014*a* and the first reverse termination impedance 1014*d* may be optimized for a first frequency, the second forward termination impedance 1014*b* and the second reverse termination impedance 1014*e* may be optimized for a second frequency, and the third forward termination impedance 1014*c* and the third reverse termination impedance 1014*f* may be optimized for a third frequency. Each of the termination impedances 1014*a*-1014*f* may be configured as a fixed or adjustable termination impedance. For example, each of the termination impedances 1014*a*-1014*f* may be configured as any of the termination impedance arrangements 602, 612, and 622 of FIG. 6 or any other type of termination impedance.

As described above, the switches 1016*a*-1016*f* can be operated to selectively couple the termination impedances 1014*a*-1014*f* to the coupled transmission line 1012. In some examples, the bidirectional coupler 1000 may be configured to operate in different modes of operation corresponding to the direction of operation (i.e., forward or reverse).

For example, in a forward mode of operation, the fourth switch 1016*d* may be controlled to couple the forward coupled port 1006*a* to the coupled transmission line 1012. The first switch 1016*a* may be controlled to couple the first forward termination impedance 1014*a* to the first forward termination port 1008*a*, the second switch 1016*b* may be controlled to couple the second forward termination impedance 1014*b* to the second forward termination port 1008*b*, and the third switch 1016*c* may be controlled to couple the third forward termination impedance 1014*c* to the third forward termination port 1008*c*. Likewise, in a reverse mode of operation, the first switch 1016*a* may be controlled to couple the reverse coupled port 1006*b* to the coupled transmission line 1012. The fourth switch 1016*d* may be controlled to couple the first reverse termination impedance 1014*d* to the first reverse termination port 1008*d*, the fifth switch 1016*e* may be controlled to couple the second reverse termination impedance 1014*e* to the second reverse termination port 1008*e*, and the sixth switch 1016*f* may be controlled to couple the third reverse termination impedance 1014*f* to the third reverse termination port 1008*f*. In some examples, the switches 1016*a*-1016*d* can be operated or controlled in unison (i.e., together); however, in other examples, the switches 1016*a*-1016*d* can be operated or controlled individually.

In one example, the bidirectional coupler 1000 can provide optimized coupling factors for each of the first, second, and third frequencies to achieve desired performance at each of the first, second, and third frequencies. In some examples, the bidirectional coupler 1000 allows multiple signals having different frequencies to be coupled at the same time (e.g., carrier aggregation). As such, the bidirectional coupler 1000 may be integrated in devices (e.g., the FEM 100) without using extra components (e.g., attenuators) to regulate the power level of the coupled signal or frequency combiner components (e.g., multiplexers) to combine multiple output signals. Likewise, the RF source providing the input signal to the bidirectional coupler 1000 (e.g., the power amplifier module 110) can be operated at a constant output power level over frequency, improving the efficiency of the power amplifier module 110 and/or the power consumption of the FEM 100. In addition, the compact footprint of the bidirectional coupler 1000 may allow the footprint or package size of the FEM 100 to be reduced.

Figure 11:
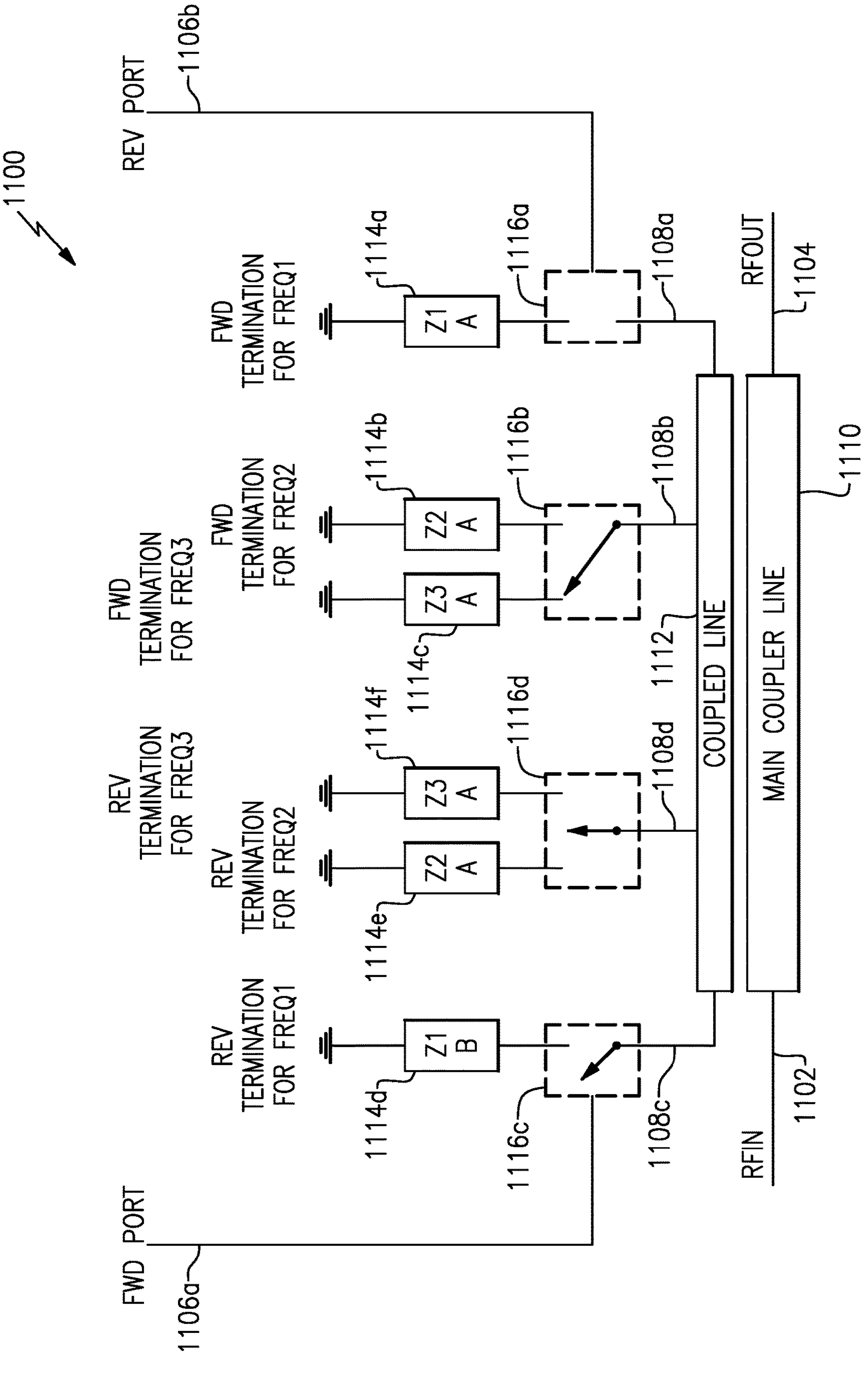
FIG. 11 is a schematic diagram of a radio frequency coupler in accordance with aspects described herein.

FIG. 11 is a schematic diagram of a bidirectional coupler 1100 in accordance with aspects described herein. In one example, the bidirectional coupler 1100 is substantially similar to the bidirectional coupler 1000 of FIG. 10, except the bidirectional coupler 1100 is configured with a reduced number of switches. As shown, the bidirectional coupler 1100 includes an input port 1102, an output port 1104, a forward coupled port 1106*a*, a reverse coupled port 1106*b*, a first forward termination port 1108*a*, a second forward termination port 1108*b*, a first reverse termination port 1108*c*, a second reverse termination port 1108*d*, a main transmission line 1110, a coupled transmission line 1112, a first forward termination impedance 1114*a*, a second forward termination impedance 1114*b*, a third forward termination impedance 1114*c*, a first reverse termination impedance 1114*d*, a second reverse termination impedance 1114*e*, a third reverse termination impedance 1114*f*, a first switch 1116*a*, a second switch 1116*b*, a third switch 1116*c*, and a fourth switch 1116*d*. The switches 1116*a*-1116*d* are operated to selectively couple the termination impedances 1114*a*-1114*f* to the coupled transmission line 1112.

In some examples, when a radio frequency signal is applied to the input port 1102 of the main transmission line 1110, the signal is output via output port 1104 of the main transmission line 1110 and a coupled signal is provided to the forward coupled port 1106*a* of the coupled transmission line 1112. Similarly, when a radio frequency signal is applied to the output port 1104 of the main transmission line 1110, the signal is output via the input port 1102 of the main transmission line 1110 and a coupled signal is provided to the reverse coupled port 1106*b* of the coupled transmission line 1112.

In one example, the termination impedances 1114*a*-1114*f* are optimized (i.e., tuned) for specific frequencies (or frequency bands). For example, the first forward termination impedance 1114*a* and the first reverse termination impedance 1114*d* may be optimized for a first frequency, the second forward termination impedance 1114*b* and the second reverse termination impedance 1114*e* may be optimized for a second frequency, and the third forward termination impedance 1114*c* and the third reverse termination impedance 1114*f* may be optimized for a third frequency. Each of the termination impedances 1114*a*-1114*f* may be configured as a fixed or adjustable termination impedance. For example, each of the termination impedances 1114*a*-1114*f* may be configured as any of the termination impedance arrangements 602, 612, and 622 of FIG. 6 or any other type of termination impedance.

As described above, the switches 1116*a*-1116*d* can be operated to selectively couple the termination impedances 1114*a*-1114*f* to the coupled transmission line 1112. In some examples, the bidirectional coupler 1100 may be configured to operate in different modes of operation corresponding to the direction of operation (i.e., forward or reverse).

For example, in a forward mode of operation, the third switch 1116*c* may be controlled to couple the forward coupled port 1106*a* to the coupled transmission line 1112. The first switch 1116*a* may be controlled to couple the first forward termination impedance 1114*a* to the first forward termination port 1108*a* and the second switch 1116*b* may be controlled to couple one of the second and third forward termination impedances 1114*b*, 1114*c* to the second forward termination port 1108*b*. Likewise, in a reverse mode of operation, the first switch 1116*a* may be controlled to couple the reverse coupled port 1106*b* to the coupled transmission line 1112. The third switch 1116*c* may be controlled to couple the first reverse termination impedance 1114*d* to the first reverse termination port 1108*c* and the fourth switch 1116*d* may be controlled to couple one of the second and third reverse termination impedances 1114*e*, 1114*f* to the second reverse termination port 1108*d*. In some examples, the switches 1116*a*-1116*d* can be operated or controlled in unison (i.e., together); however, in other examples, the switches 1116*a*-1116*d* can be operated or controlled individually.

In one example, the bidirectional coupler 1100 can provide optimized coupling factors for each of the first, second, and third frequencies to achieve desired performance at each of the first, second, and third frequencies. In some examples, the bidirectional coupler 1100 allows multiple signals having different frequencies to be coupled at the same time (e.g., carrier aggregation). As such, the bidirectional coupler 1100 may be integrated in devices (e.g., the FEM 100) without using extra components (e.g., attenuators) to regulate the power level of the coupled signal or frequency combiner components (e.g., multiplexers) to combine multiple output signals. Likewise, the RF source providing the input signal to the bidirectional coupler 1100 (e.g., the power amplifier module 110) can be operated at a constant output power level over frequency, improving the efficiency of the power amplifier module 110 and/or the power consumption of the FEM 100. In addition, being that the bidirectional coupler 1100 is configured with a reduced number of switches, the compact footprint of the bidirectional coupler 1100 may allow the footprint or package size of the FEM 100 to be reduced even further.

Figure 12:
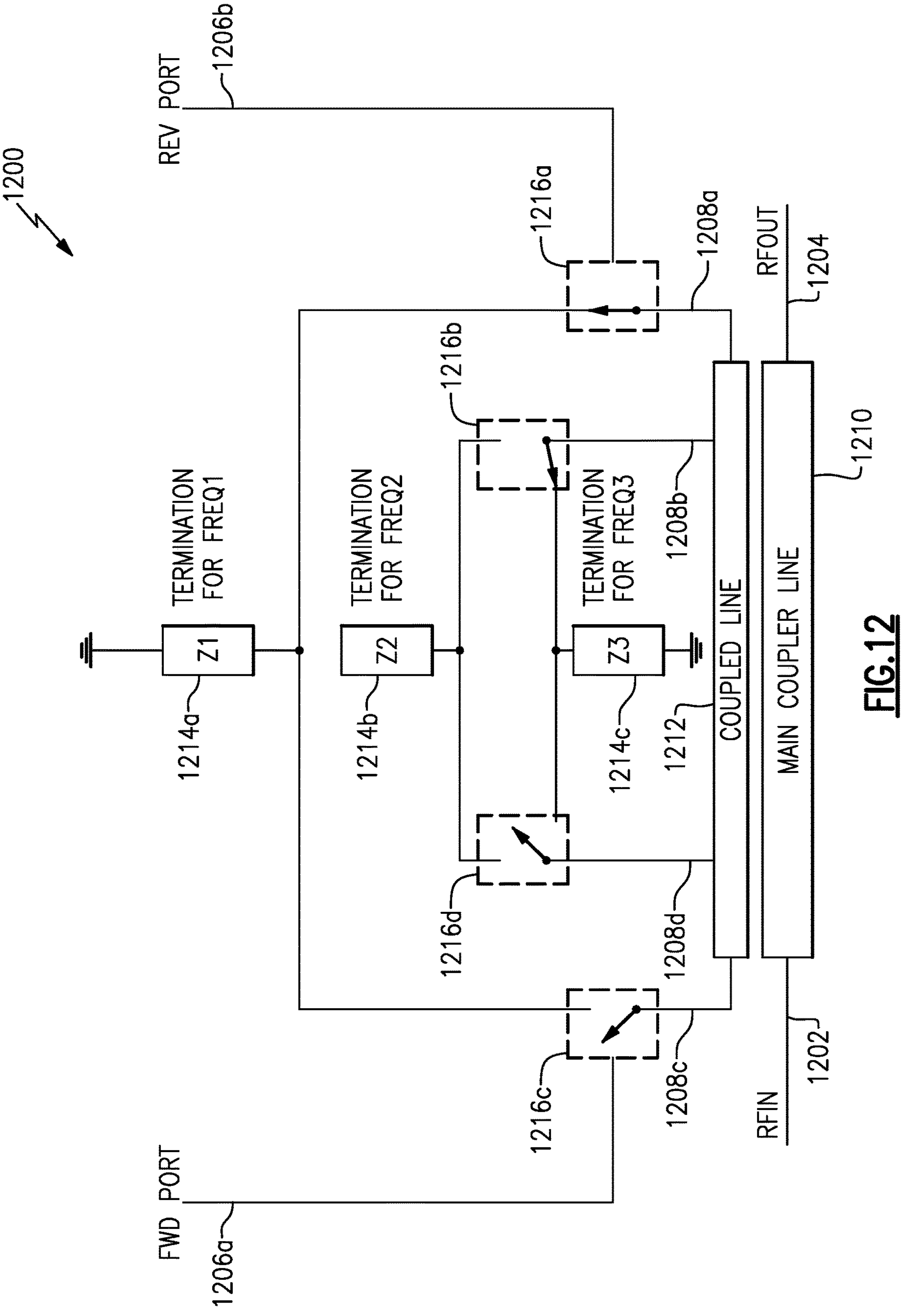
FIG. 12 is a schematic diagram of a radio frequency coupler in accordance with aspects described herein.

FIG. 12 is a schematic diagram of a bidirectional coupler 1200 in accordance with aspects described herein. In one example, the bidirectional coupler 1200 is substantially the same as the bidirectional coupler 1000 of FIG. 10, except the bidirectional coupler 1200 is configured to use common termination impedances for both the forward and reverse modes of operation. As shown, the bidirectional coupler 1200 includes an input port 1202, an output port 1204, a forward coupled port 1206*a*, a reverse coupled port 1206*b*, a first forward termination port 1208*a*, a second forward termination port 1208*b*, a first reverse termination port 1208*c*, a second reverse termination port 1208*d*, a main transmission line 1210, a coupled transmission line 1212, a first termination impedance 1214*a*, a second termination impedance 1214*b*, a third termination impedance 1214*c*, a first switch 1216*a*, a second switch 1216*b*, a third switch 1216*c*, and a fourth switch 1216*d*. The switches 1216*a*-1216*d* are operated to selectively couple the termination impedances 1214*a*-1214*c* to the coupled transmission line 1212.

In some examples, when a radio frequency signal is applied to the input port 1202 of the main transmission line 1210, the signal is output via output port 1204 of the main transmission line 1210 and a coupled signal is provided to the forward coupled port 1206*a* of the coupled transmission line 1212. Similarly, when a radio frequency signal is applied to the output port 1204 of the main transmission line 1210, the signal is output via the input port 1202 of the main transmission line 1210 and a coupled signal is provided to the reverse coupled port 1206*b* of the coupled transmission line 1212.

In one example, the termination impedances 1214*a*-1214*c* are optimized (i.e., tuned) for specific frequencies (or frequency bands). For example, the first termination impedance 1214*a* may be optimized for a first frequency, the second termination impedance 1214*b* may be optimized for a second frequency, and the third termination impedance 1214*c* may be optimized for a third frequency. Each of the termination impedances 1214*a*-1214*c* may be configured as a fixed or adjustable termination impedance. For example, each of the termination impedances 1214*a*-1214*c* may be configured as any of the termination impedance arrangements 602, 612, and 622 of FIG. 6 or any other type of termination impedance.

As described above, the switches 1216*a*-1216*d* can be operated to selectively couple the termination impedances 1214*a*-1214*c* to the coupled transmission line 1212. In some examples, the bidirectional coupler 1200 may be configured to operate in different modes of operation corresponding to the direction of operation (i.e., forward or reverse).

For example, in a forward mode of operation, the third switch 1216*c* may be controlled to couple the forward coupled port 1206*a* to the coupled transmission line 1212. The first switch 1216*a* may be controlled to couple the first termination impedance 1214*a* to the first forward termination port 1208*a* and the second switch 1216*b* may be controlled to couple one of the second and third termination impedances 1214*b*, 1214*c* to the second forward termination port 1208*b*. Likewise, in a reverse mode of operation, the first switch 1216*a* may be controlled to couple the reverse coupled port 1206*b* to the coupled transmission line 1212. The third switch 1216*c* may be controlled to couple the first termination impedance 1214*a* to the first reverse termination port 1208*c* and the fourth switch 1216*d* may be controlled to couple one of the second and third termination impedances 1214*b*, 1214*c* to the second reverse termination port 1208*d*. In some examples, the switches 1216*a*-1216*d* can be operated or controlled in unison (i.e., together); however, in other examples, the switches 1216*a*-1216*d* can be operated or controlled individually.

In one example, the bidirectional coupler 1200 can provide optimized coupling factors for each of the first, second, and third frequencies to achieve desired performance at each of the first, second, and third frequencies. In some examples, the bidirectional coupler 1200 allows multiple signals having different frequencies to be coupled at the same time (e.g., carrier aggregation). As such, the bidirectional coupler 1200 may be integrated in devices (e.g., the FEM 100) without using extra components (e.g., attenuators) to regulate the power level of the coupled signal or frequency combiner components (e.g., multiplexers) to combine multiple output signals. Likewise, the RF source providing the input signal to the bidirectional coupler 1200 (e.g., the power amplifier module 110) can be operated at a constant output power level over frequency, improving the efficiency of the power amplifier module 110 and/or the power consumption of the FEM 100. In addition, being that the bidirectional coupler 1200 is configured with common termination impedances, the compact footprint of the bidirectional coupler 1200 may allow the footprint or package size of the FEM 100 to be reduced even further.

As described above, the switches shown in FIGS. 8-12 may be controlled/operated in unison or independently. For example, when the bidirectional coupler 1000 of FIG. 10 is operating in the forward mode of operation, the switches 1016*a*, 1016*b*, 1016*c* may be controlled in unison to couple the forward termination impedances 1014*a*, 1014*b*, 1014*c* to the coupled transmission line 1012. However, if the frequency of the input signal received at the input port 1002 is known, the switches 1016*a*-1016*c* may be operated differently. For example, if the input signal corresponds to the first frequency, the first switch 1016*a* may be controlled to couple the first forward termination impedance 1014*a* to the coupled transmission line 1012 and the second and third switches 1016*b*, 1016*c* may be left open or disconnected from the coupled transmission line 1012. Likewise, if the input signal corresponds to the second frequency, the second switch 1016*b* may be controlled to couple the second forward termination impedance 1014*b* to the coupled transmission line 1012 and the first and third switches 1016*a*, 1016*c* may be left open or disconnected from the coupled transmission line 1012. The switches 1014*d*-1014*f* may be controlled similarly during the reverse mode of operation. It should be appreciated that any of the switches shown in FIGS. 8-12 may be operated or controlled in a similar manner.

As shown in FIGS. 8-12, the placement (or location) of the termination impedances is symmetric along the length of the coupled transmission line, such that the forward coupling factor is substantially the same as the reverse coupling factor. For example, as shown in FIG. 10, the first forward termination impedance 1014*a* and the first reverse termination impedance 1014*d* are arranged symmetrically along the coupled transmission line 1012 such that the coupling factor for the first frequency is substantially the same in the forward and reverse directions. Likewise, the second forward termination impedance 1014*b* and the second reverse termination impedance 1014*e* are arranged symmetrically along the coupled transmission line 1012 such that the coupling factor for the second frequency is substantially the same in the forward and reverse directions. While the placement (or location) of the termination impedances is shown in FIGS. 8-12 as being symmetric along the length of the coupled transmission line, it should be appreciated that in other examples the termination impedances may be arranged differently. For example, the termination impedances may be arranged or placed asymmetrically to provide different coupling factors in the forward and reverse directions.

It should be appreciated that any of the couplers described above may be used in a variety of wireless applications. For example, each coupler may be configured for use in wireless local area network (WLAN), ultra-wideband (UWB), wireless personal area network (WPAN), 4G cellular, and LTE cellular applications.

In some examples, the switches included in any of the couplers (e.g., switches 816*a*-816*b* of the bidirectional coupler 800) may include gallium nitride (GaN), gallium arsenide (GaAs), or silicon germanium (SiGe) transistors. In certain examples, the transistors may be configured as heterojunction bipolar transistors (HBT), high-electron-mobility transistors (HEMT), metal-oxide-semiconductor field effect transistors (MOSFET), and/or complementary metal-oxide-semiconductors (CMOS). In some examples, any of the couplers, or one or more components of the couplers, may be fabricated using silicon-on-insulator (SOI) techniques.

Embodiments of the couplers described herein may be advantageously used in a variety of electronic devices. Examples of the electronic devices can include, but are not limited to, consumer electronic products, parts of consumer electronic products, electronic test equipment, cellular communications infrastructure such as a base station, etc. Examples of the electronic devices can include, but are not limited to, a router, a gateway, a mobile phone such as a smart phone, a cellular front end module, a telephone, a television, a computer monitor, a computer, a modem, a hand-held computer, a laptop computer, a tablet computer, an electronic book reader, a wearable computer such as a smart watch, a personal digital assistant (PDA), an appliance, such as a microwave, refrigerator, or other appliance, an automobile, a stereo system, a DVD player, a CD player, a digital music player such as an MP3 player, a radio, a camcorder, a camera, a digital camera, a portable memory chip, a health-care-monitoring device, a vehicular electronics system such as an automotive electronics system or an avionics electronic system, a peripheral device, a wrist watch, a clock, etc. Further, the electronic devices can include unfinished products.

As described above, improved signal couplers are provided herein. In at least one embodiment, the couplers include multiple terminations arranged to provide different coupling factors optimized for a range of signal frequencies. In some examples, each termination is connected to the coupled line of the coupler at a different location to provide different coupling factors. In certain examples, the multiple terminations are configured to maintain a substantially constant coupled power level while minimizing insertion loss over the range of signal frequencies.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A radio frequency signal coupler comprising:
an input port;
an output port;
a main transmission line extending between the input port and the output port;
a continuous coupled transmission line electromagnetically coupled to the main transmission line;
at least one coupled port coupled to the continuous coupled transmission line; and
a plurality of termination ports configured to selectively couple to the continuous coupled transmission line to provide a plurality of coupling factors corresponding to a plurality of signal frequencies, at least one termination port of the plurality of termination ports configured to selectively couple to the continuous coupled transmission line at a location between a first end and a second end of the continuous coupled transmission line, and at least one different termination port of the plurality of termination ports configured to selectively couple to the continuous coupled transmission line at a different location than the at least one termination port, the plurality of termination ports being configured to selectively couple to the continuous coupled transmission line, and at least two termination ports having different termination impedance and being configured to be selectively coupled to the continuous coupled transmission line simultaneously.

2. The radio frequency signal coupler of claim 1 further comprising a plurality of termination impedances coupled to the plurality of termination ports.

3. The radio frequency signal coupler of claim 2 further comprising a plurality of switches configured to selectively connect the plurality of termination impedances to the plurality of termination ports.

4. The radio frequency signal coupler of claim 3 wherein the switches of the plurality of switches are symmetrically coupled to the continuous coupled transmission line and configured to selectively couple the impedances of the plurality of termination impedances based on a radio frequency signal being received at the input port or the output port.

5. The radio frequency signal coupler of claim 2 wherein each termination impedance of the plurality of termination impedances includes a fixed impedance and/or an adjustable impedance.

6. The radio frequency signal coupler of claim 2 wherein a first termination impedance of the plurality of termination impedances is coupled to a first termination port of the plurality of termination ports and a second termination impedance of the plurality of termination impedances is coupled to a second termination port of the plurality of termination ports.

7. The radio frequency signal coupler of claim 6 wherein the first termination impedance is tuned to a first signal frequency of the plurality of signal frequencies and the second termination impedance is tuned to a second signal frequency of the plurality of signal frequencies.

8. The radio frequency signal coupler of claim 7 wherein the first termination port is connected to the continuous coupled transmission line at a first location to provide a first coupling factor corresponding to the first signal frequency and the second termination port is connected to the continuous coupled transmission line at a second location to provide a second coupling factor corresponding to the second signal frequency.

9. The radio frequency signal coupler of claim 8 wherein the first coupling factor corresponds to a first length of the continuous coupled transmission line between the first termination port and the at least one coupled port and the second coupling factor corresponds to a second length of the continuous coupled transmission line between the second termination port and the at least one coupled port.

10. The radio frequency signal coupler of claim 8 wherein the first coupling factor is selected to provide a desired level of insertion loss at the first signal frequency and the second coupling factor is selected to provide a desired level of insertion loss at the second signal frequency.

11. The radio frequency signal coupler of claim 10 wherein the first coupling factor at the first signal frequency is substantially similar to the second coupling factor at the second signal frequency.

12. The radio frequency signal coupler of claim 10 wherein the radio frequency signal coupler is configured to minimize insertion loss between the input port and the output port at the first and second signal frequencies.

13. The radio frequency signal coupler of claim 12 wherein the at least one coupled port includes a first coupled port configured to provide a first coupled signal when an input radio frequency signal is received at the input port.

14. The radio frequency signal coupler of claim 13 wherein the radio frequency signal coupler is configured to maintain a substantially constant power level of the first coupled signal at the first and second signal frequencies.

15. The radio frequency signal coupler of claim 14 wherein the at least one coupled port includes a second coupled port configured to provide a second coupled signal when an input radio frequency signal is received at the output port.

16. The radio frequency signal coupler of claim 15 wherein the radio frequency signal coupler is configured to maintain a substantially constant power level of the second coupled signal at the first and second signal frequencies.

17. A radio frequency signal coupler comprising:

an input port;

an output port;

a main transmission line extending between the input port and the output port;

a continuous coupled transmission line electromagnetically coupled to the main transmission line;

at least one coupled port coupled to the continuous coupled transmission line; and a plurality of termination ports configured to selectively couple to the continuous coupled transmission line to provide a plurality of coupling factors corresponding to a plurality of signal frequencies, at least one termination port of the plurality of termination ports configured to selectively couple to the continuous coupled transmission line at a location between a first end and a second end of the continuous coupled transmission line, and at least one different termination port of the plurality of termination ports configured to selectively couple to the continuous coupled transmission line at a different location than the at least one termination port, the radio frequency signal coupler being configured to maintain a substantially constant power level of a first coupled signal at a first signal frequency of the plurality of signal frequencies and at a second signal frequency of the plurality of signal frequencies, and to maintain a substantially constant power level of a second coupled signal at the first signal frequency and the second signal frequency.

18. A method of reducing insertion loss in a radio frequency coupler, the method comprising:

receiving a radio frequency (RF) signal on a first transmission line that is electromagnetically coupled to a continuous second transmission line, the RF signal having a frequency that is one of a first frequency and a second frequency different than the first frequency;

inducing an induced RF signal on the continuous second transmission line based on the RF signal, the induced RF signal having one of the first frequency and the second frequency corresponding to the frequency of the RF signal;

terminating the induced RF signal having the first frequency at a first position along a length of the continuous second transmission line to provide a first coupled signal with a first coupling factor; and terminating the induced RF signal having the second frequency at a second position along the continuous second transmission line to provide a second coupled signal with a second coupling factor that is substantially the same as the first coupling factor.

19. The method of claim 18, the method further comprising adjusting at least one impedance of a plurality of impedances coupled to the continuous second transmission line to change the coupling factor of the first transmission line and the continuous second transmission line.

20. The method of claim 19, the continuous second transmission line having one or more switches coupled to the plurality of impedances, the method further comprising selectively switching the switches on or off based on at least one of a direction or frequency of the RF signal.

21. The method of claim 18, the method further comprising selecting the first and second positions to maximize directivity at the first and second frequencies, maximize isolation at the first and second frequencies, minimize the first coupling factor at the first frequency, and minimize the second coupling factor at the second frequency.

* * * * *